United States Patent [19]
Dimino

[11] Patent Number: 5,918,180
[45] Date of Patent: *Jun. 29, 1999

[54] TELEPHONE OPERABLE GLOBAL TRACKING SYSTEM FOR VEHICLES

[76] Inventor: Michael Dimino, 410 Brickyard Rd., Freehold, N.J. 07728

[ * ] Notice: This patent issued on a continued prosecution application filed under 37 CFR 1.53(d), and is subject to the twenty year patent term provisions of 35 U.S.C. 154(a)(2).

[21] Appl. No.: 08/655,667

[22] Filed: Dec. 22, 1995

[51] Int. Cl.[6] .................. H04Q 7/32; H04Q 7/34
[52] U.S. Cl. ............ 455/456; 340/988; 340/989; 340/992; 340/825.5; 701/213; 701/215; 701/222
[58] Field of Search ............... 455/456, 422, 455/426, 458, 521; 342/357, 457; 364/449; 340/988, 426, 989, 991, 992, 993, 996, 425.5, 435, 436, 438, 539; 701/213

[56] References Cited

U.S. PATENT DOCUMENTS

| | | | |
|---|---|---|---|
| 4,737,976 | 4/1988 | Borth et al. | 379/58 |
| 4,742,336 | 5/1988 | Hall et al. | 340/539 |
| 4,825,457 | 4/1989 | Lebowitz | 379/40 |
| 4,833,477 | 5/1989 | Tendler | 342/389 |
| 4,961,212 | 10/1990 | Marui et al. | 379/67 |
| 5,019,802 | 5/1991 | Brittain et al. | 340/522 |
| 5,025,261 | 6/1991 | Ohta et al. | 342/357 |
| 5,081,667 | 1/1992 | Drori et al. | 379/59 |
| 5,148,471 | 9/1992 | Metroka et al. | 379/58 |
| 5,223,844 | 6/1993 | Mansell et al. | 342/357 |
| 5,247,564 | 9/1993 | Zicker | 379/40 |
| 5,317,620 | 5/1994 | Smith | 379/40 |
| 5,319,698 | 6/1994 | Glidewell et al. | 379/39 |
| 5,334,974 | 8/1994 | Simms et al. | 340/990 |
| 5,353,376 | 10/1994 | Oh et al. | 395/2.42 |
| 5,357,560 | 10/1994 | Nykerk | 379/59 |
| 5,379,224 | 1/1995 | Brown et al. | 364/449 |
| 5,402,466 | 3/1995 | Delahanty | 379/44 |
| 5,418,537 | 5/1995 | Bird | 342/357 |
| 5,479,482 | 12/1995 | Grimes | 455/422 |
| 5,515,043 | 5/1996 | Berard et al. | 340/988 |
| 5,546,445 | 8/1996 | Dennison et al. | 342/357 |
| 5,625,668 | 4/1997 | Loomis et al. | 342/357 |

Primary Examiner—Wellington Chin
Assistant Examiner—Keith Ferguson
Attorney, Agent, or Firm—Ostrolenk, Faber, Gerb & Soffen, LLP

[57] ABSTRACT

A tracking system for monitoring and locating vehicles includes a cellular telephone that is located in the vehicle, a global positioning system (GPS) receiver also located with the vehicle, and an interface unit between the global positioning receiver and the telephone. The global positioning receiver communicates with a system of satellites and provides continuous data, reflecting the present. spacial position of the vehicle in terms of its latitude/longitude coordinates. The interface between the GPS receiver and the wireless telephone includes a speech synthesizer circuit which converts the digitally encoded spacial coordinates into speech, which enunciates the position through the cellular telephone. By calling the vehicle cellular telephone from a remote location, the owner of the vehicle can hear the location of the vehicle, and then use that information to obtain its precise location.

25 Claims, 23 Drawing Sheets

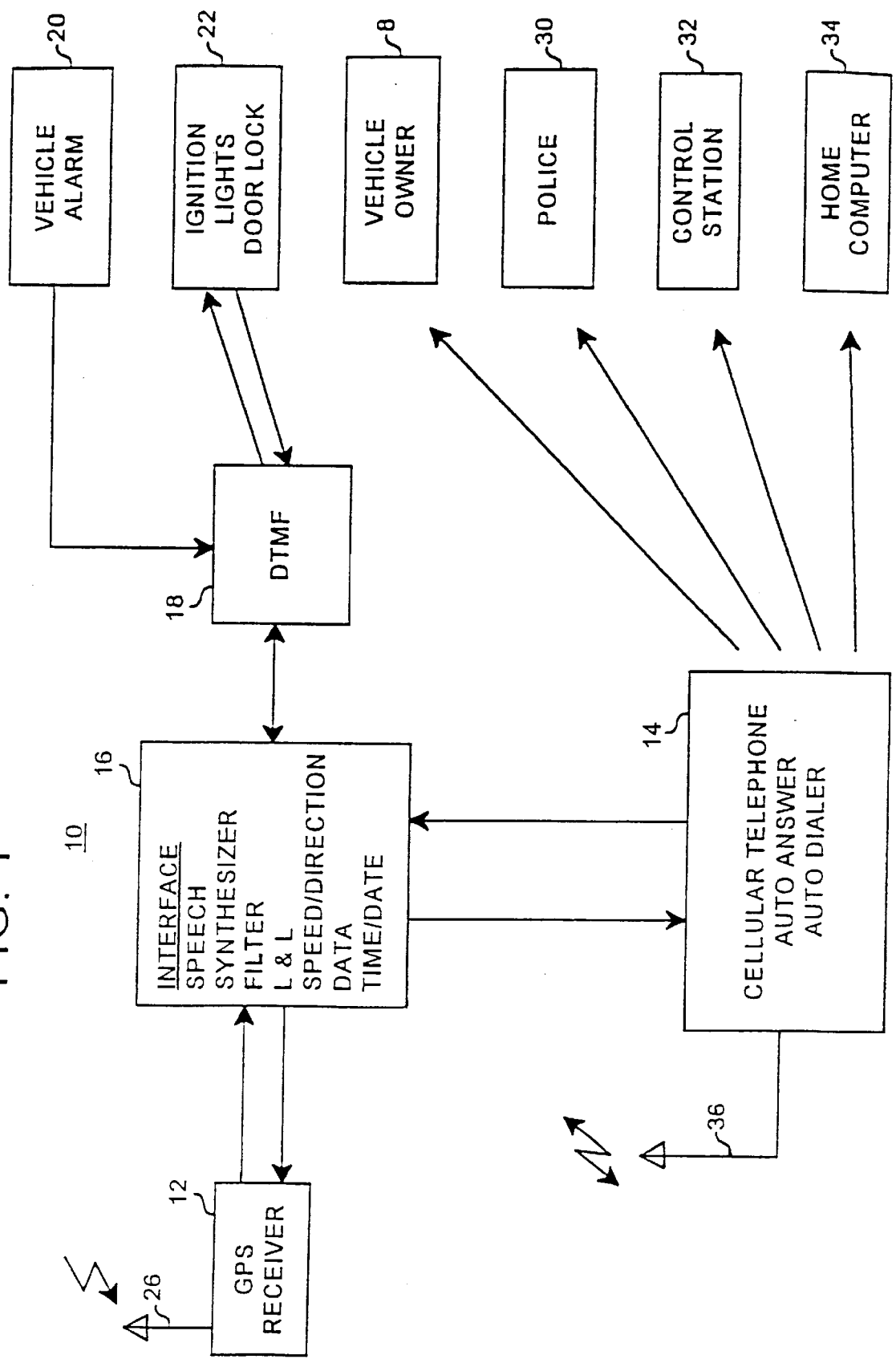

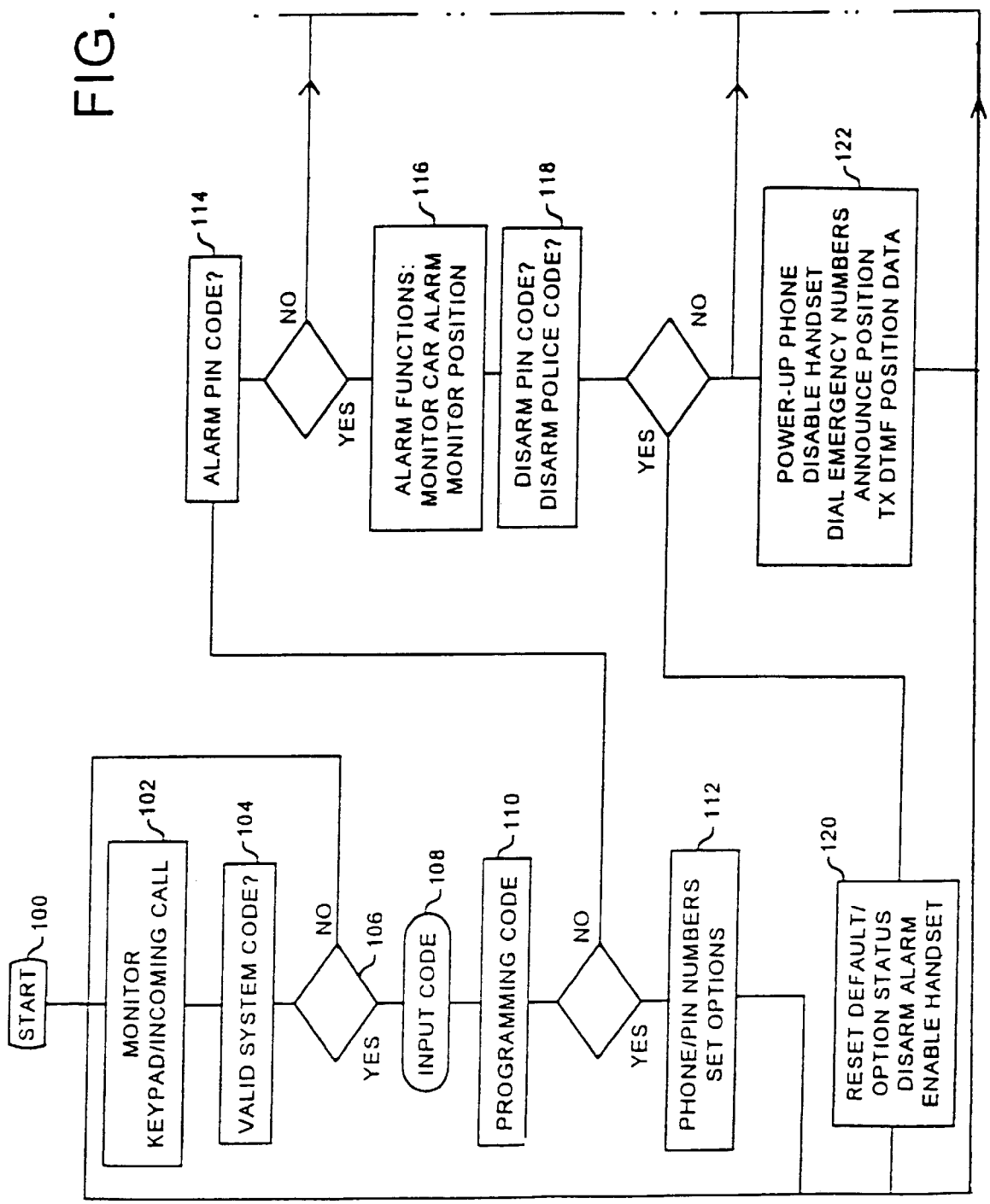

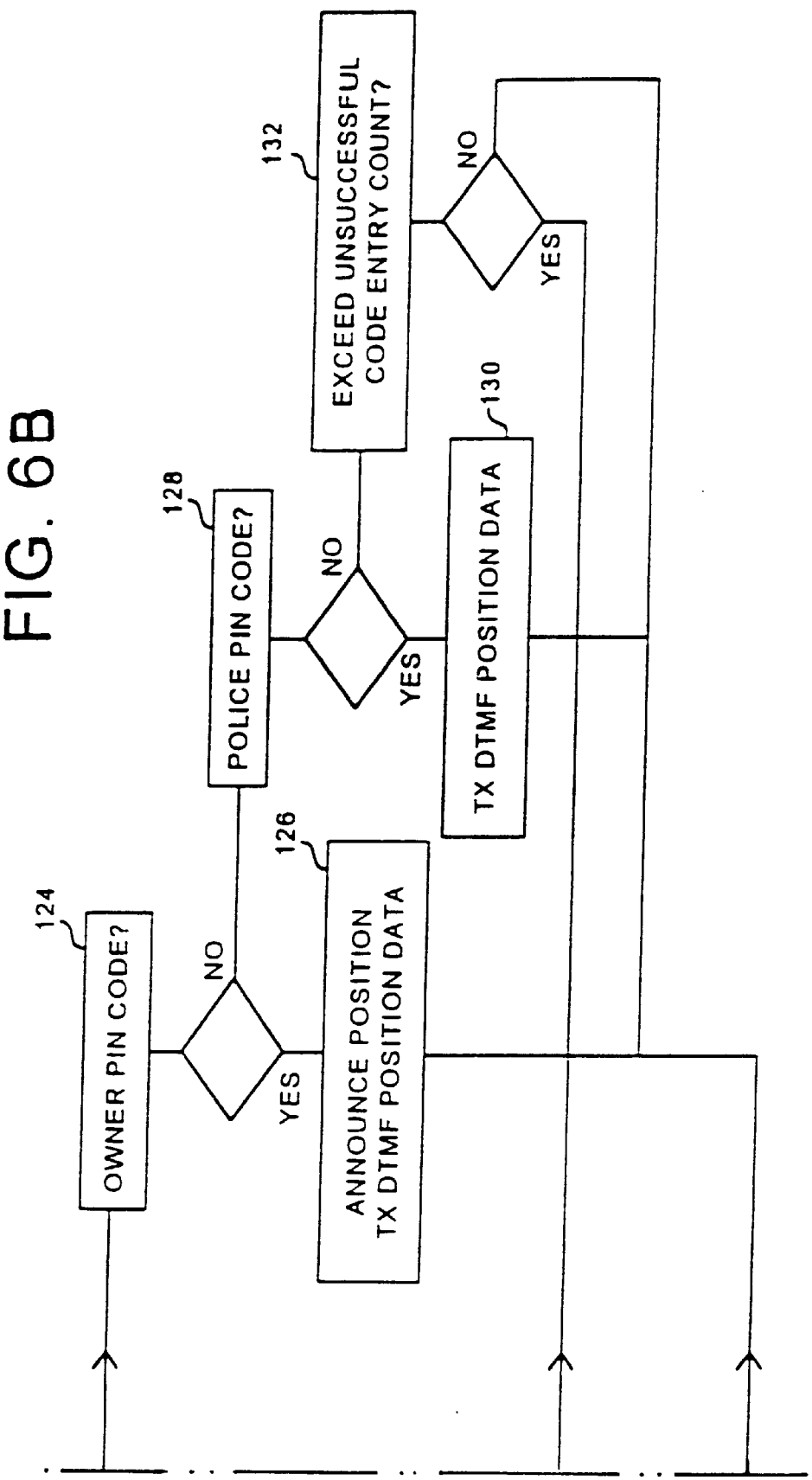

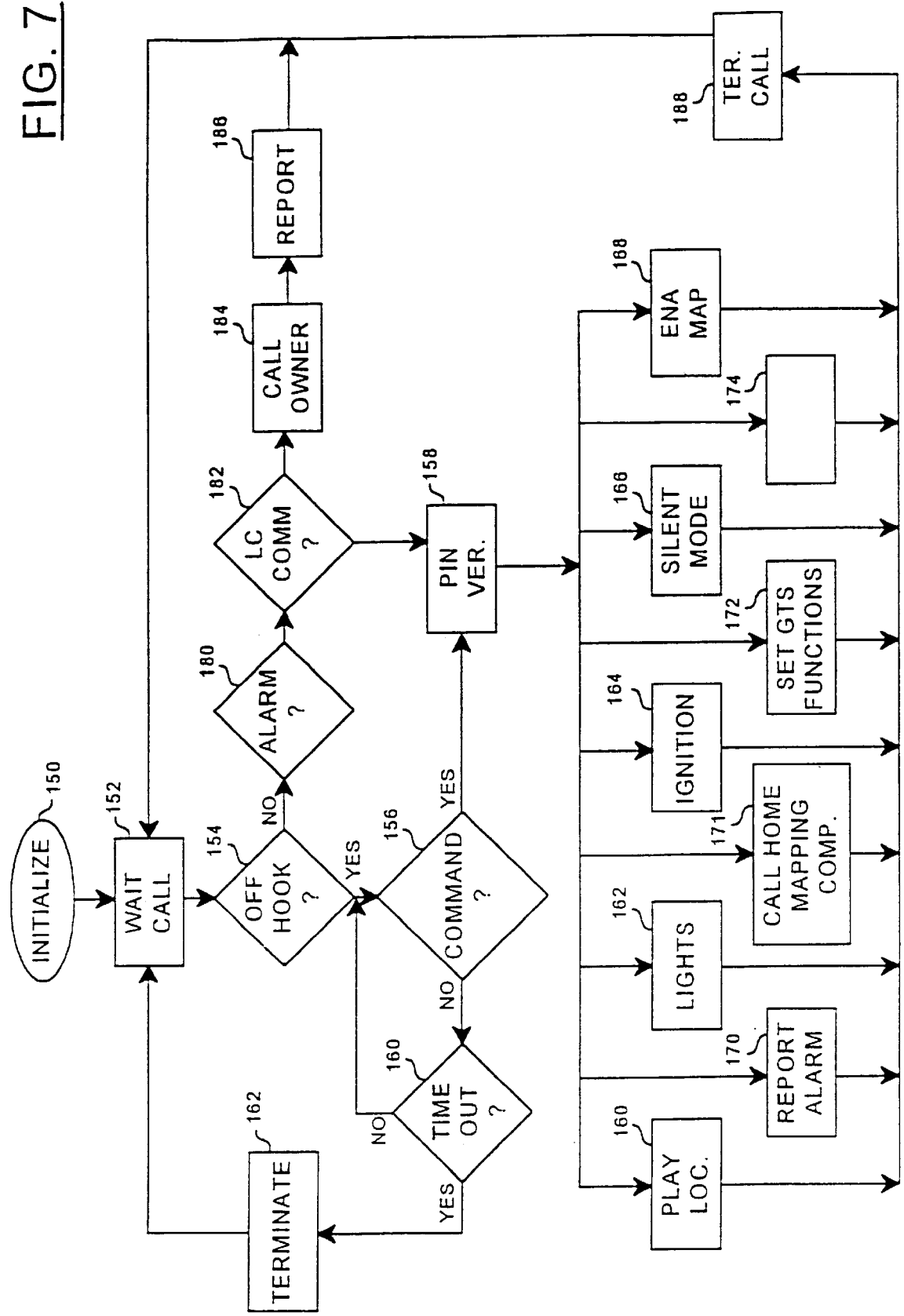

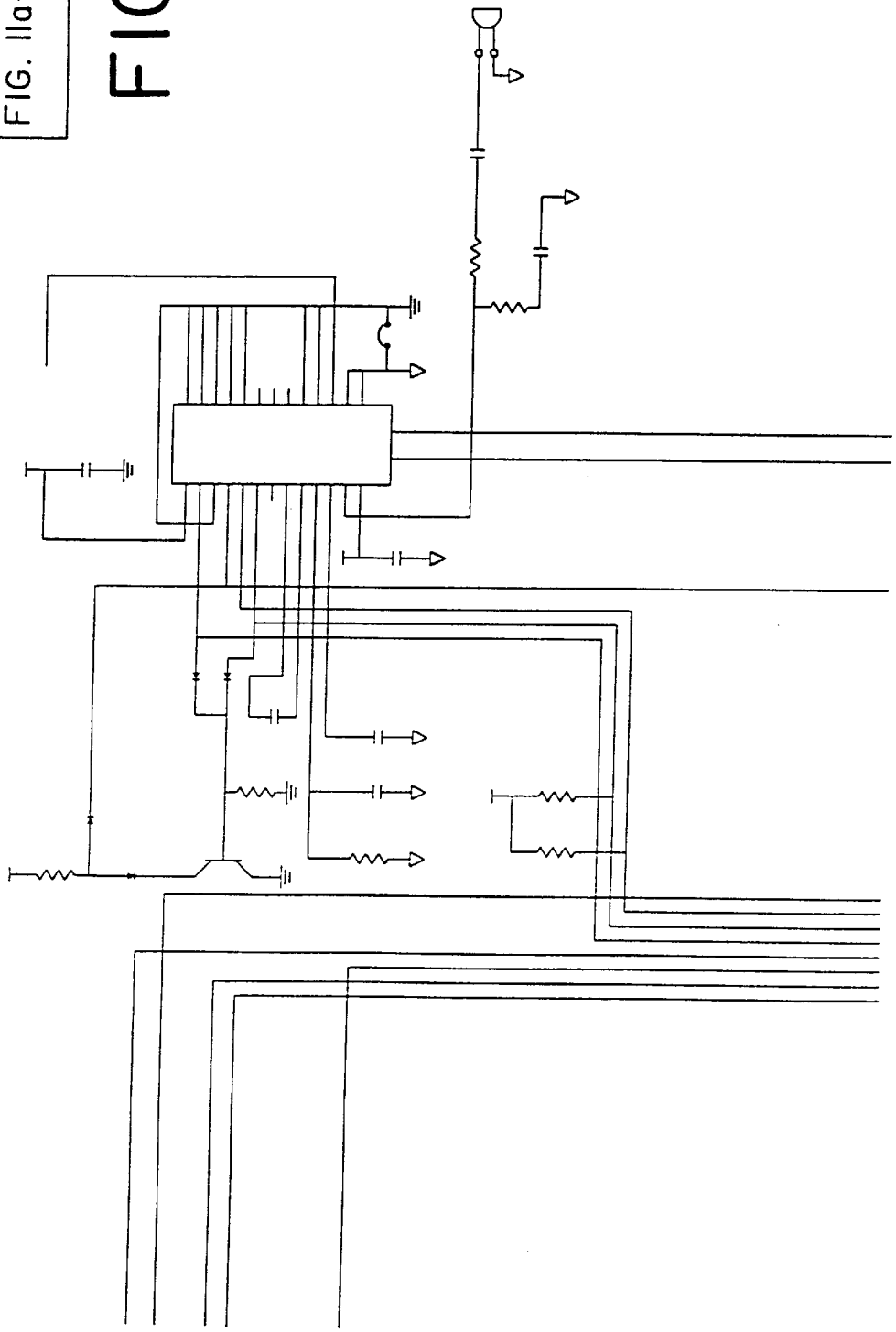

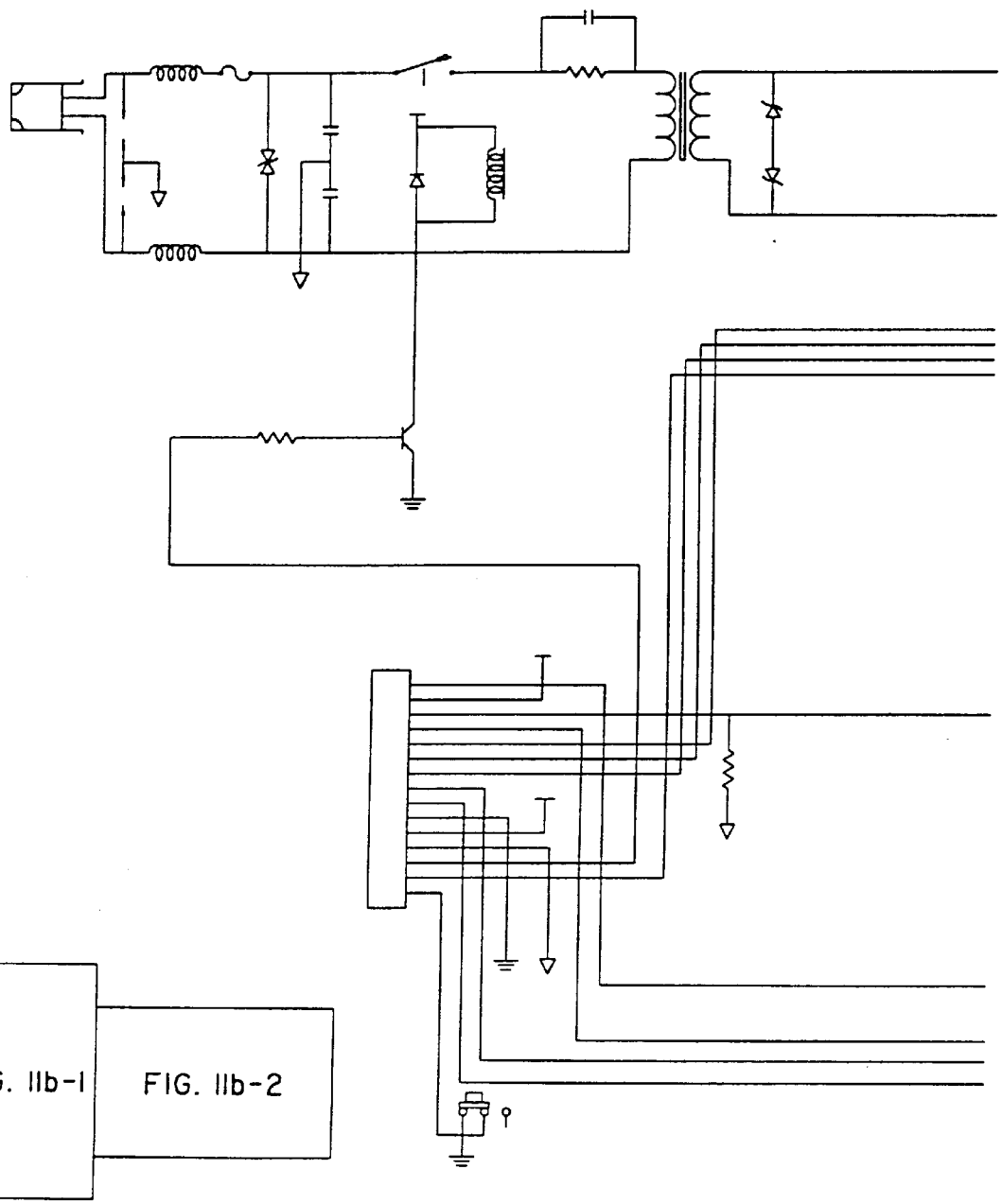
FIG. IIb
FIG. IIb-1

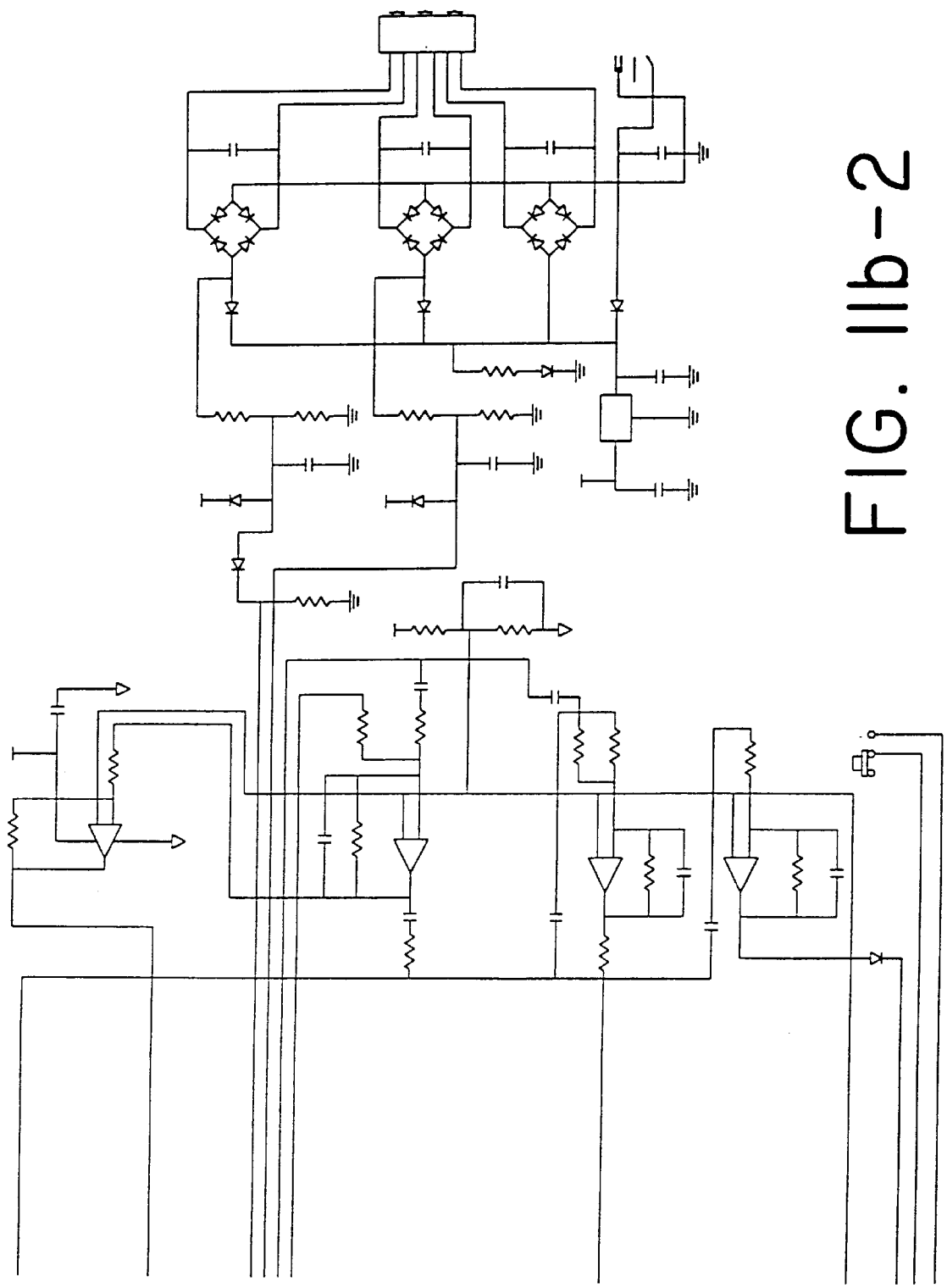
FIG. IIb-2

GTS / PHONE IN PASSENGER COMPARTMENT

GTS / PHONE IN TRUCK

TELEPHONE OPERABLE GLOBAL TRACKING SYSTEM FOR VEHICLES

BACKGROUND OF THE INVENTION

The present invention generally relates to vehicles and, more particularly relates to a system for enabling locating and tracking movements of vehicles, for example, stolen vehicles or fleets of vehicles or any moving object.

Vehicle thefts have reached plague proportions in the United States. Aside from the inconvenience of having lost ones mode of transportation, the cost to the economy in the form of insurance expenses, law enforcement activities and other incidental payments, is enormous. Stolen vehicles are often transported or driven to remote locations where they are stripped of their parts. However, a sizeable portion of stolen vehicles continues to remain in use and valuable police department resources must be continuously allocated in finding these vehicles.

Therefore, the advantages and benefits of systems which enable owners to locate their stolen vehicles is obvious. LOJACK™ is a known, prior art system for locating vehicles, which relies on equipping vehicles with transmitters which emit characteristic tones to enable law enforcement agents to track and thus locate the stolen vehicles. With LOJACK™, the vehicle owner must report the theft to the company that operates the LOJACK™ system as well as to the police. It is a complex system. Several steps need to be taken prior to the actual search, including contacting the Department of Motor Vehicles to obtain the vehicle's identification number. Therefore, a considerable delay ensues from the discovery of the theft to the commencement of tracking by police or the agencies. Moreover, the use of the LOJACK™ system is further hampered by the fact that the system is presently operable in only a small number of States, and only in major metropolitan regions. Also, each tracking station can only monitor over a 12 to 20 square mile region, and therefore vehicles that have been transported out of range cannot be tracked.

Other existing devices or systems for preventing or thwarting vehicle theft have similarly not been fully satisfactory. For example, conventional systems comprising hood, door and trunk locks and/or motion detectors designed to trigger sirens have saturated the public to the point where they are often ignored. These known systems are also easily defeated. The tide of ever increasing car theft has not been satisfactorily checked to date.

The general aim of the present invention is to provide an enhanced system for locating vehicles and/or for monitoring the movements of vehicles, in a manner that overcomes many of the drawbacks of the prior art.

SUMMARY OF THE INVENTION

Accordingly it is an object of the present invention to provide a system for monitoring movements of vehicles in a manner that enables the owners and/or operators or users thereof to locate their vehicles promptly and easily.

It is a further object of the invention to provide a vehicle monitoring system that is simple, relatively inexpensive and easy to use.

Yet a further object of the invention is to provide a vehicle monitoring system that primarily uses existing, reliable and proven systems to implement the same.

It is also an object of the present invention to provide a vehicle monitoring system that uses the vehicle's wireless telephone in conjunction with the known GPS system (Global Positioning System) which is presently operable throughout the World.

Another object of the present invention is to provide a tracking system for enabling owners of fleets of vehicles, e.g. trucks, taxis, rental automobiles, government vehicles, etc. to monitor and manage the movements of their vehicles to assure efficient, prompt and proper operation of these vehicles by their drivers.

The foregoing and other objects of the present invention are realized, in accordance with a first embodiment of the present invention with what the present inventor regards as a GTS, i.e. a Global Tracking System. The GTS essentially consists of a conventional car telephone which includes automatic answering capabilities and a conventional GPS (global positioning system) receiver. The GTS (global tracking system) of the present invention includes a special interface circuit for coupling the conventional telephone to the conventional GPS system to realize a remotely operable (off vehicle) vehicle tracking system. Essentially, the interface component of the GTS serves to convert conventional coordinate position data supplied by the GPS system into voice, i.e. spoken words, which are then played back and/or relayed back to the owner of the vehicle through the vehicle telephone. The owner can then consult look up tables which provide the exact location, e.g. city and cross streets, where the vehicle is currently located.

In accordance with a more elaborate embodiment of the present invention, the interface includes a controller e.g., a microcomputer and circuitry for providing elaborate, multi-purpose interfacing between and among the vehicle's telephone, alarm system, ignition, lighting system etc. and the aforementioned global positioning system (GPS).

Some of the functions realized by the GTS unit of the invention include:

remote calling of the vehicle to obtain the vehicle's present spacial coordinates;

entry of spacial coordinates into a home computer to obtain the vehicle's location;

sensing and providing information about vehicle's speed and direction;

turning the vehicle's ignition on and off remotely;

initiating telephone calls from the vehicle to the owner's home or business or other telephone, when the vehicle alarm has been triggered;

silent (no ringing, no voice, etc.) communications with the vehicle so as not to alert the thief;

automatic sensing and alerting of owner when the vehicle's telephone or antenna have been broken or disabled.

storing vehicle's movements in the controller and subsequently relaying/transmitting to the vehicle's owner the vehicle's path since it was last parked.

The system of the present invention provides owners of vehicles with numerous other options and features including a navigation system which enables the driver to plot the vehicle location on an on-board computer-controlled map display, and an ability to enter a destination and obtain directions to that destination. Further, the invention includes the concept of connecting PCMCIA mapping software to the GTS unit, to provide exact mapping of a route via a look up table in the PCMCIA card. Thus, the invention also constitutes a global mapping system for vehicles, more sophisticated than the existing GPS system which only provides global longitude/latitude coordinates. Alternatively, the system of the present invention includes the method of providing an off-vehicle mapping database accessible by calling a 900 toll number to obtain data which can be used to plot the vehicle's current position and/or movements.

Other applications include obtaining roadside assistance, so that when a driver is lost, he/she may call a central station to download from the GTS unit of the vehicle its present spacial coordinates and obtain in return information such as how to get to a desired destination. Of course, the system can be used for calling emergency services such as ambulance, tow truck, police, and similar services.

Other features and advantages of the present invention will become apparent from the following description of the invention which refers to the accompanying drawings.

BRIEF DESCRIPTION OF THE DRAWINGS

FIG. 1 is a block diagram of the system hardware, in accordance with a first embodiment of the invention.

FIG. 6 is a software flow chart describing a portion of software used to control a microprocessor controlled GTS unit.

FIG. 7 is an overall, general software block diagram which illustrates various software driven control/protocol functions implemented and used by the present invention.

FIGS. 11a and 11b are schematics of a dialor controller.

DETAILED DESCRIPTION OF EMBODIMENTS OF THE INVENTION

Figures 1, 11A:
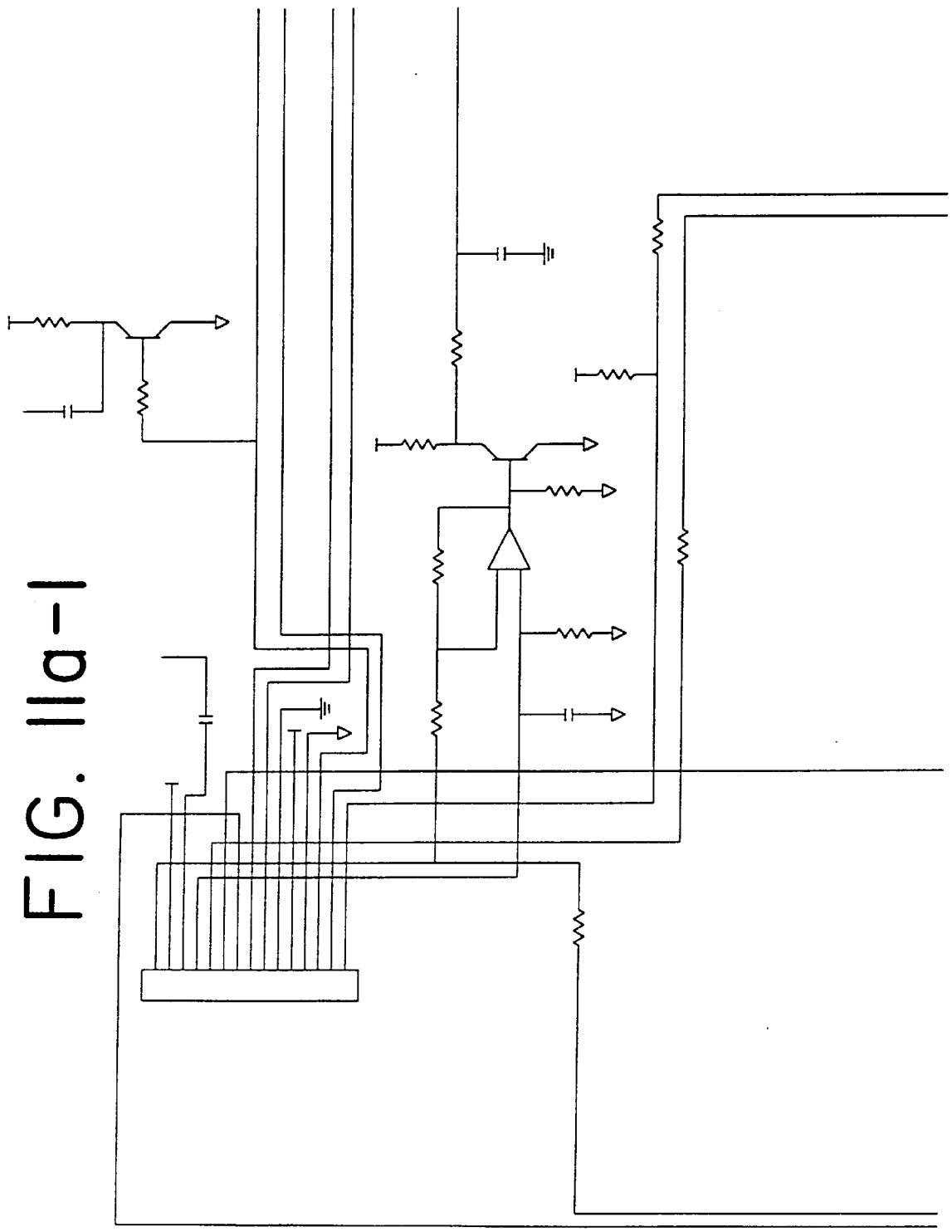
Figures 3, 11A:
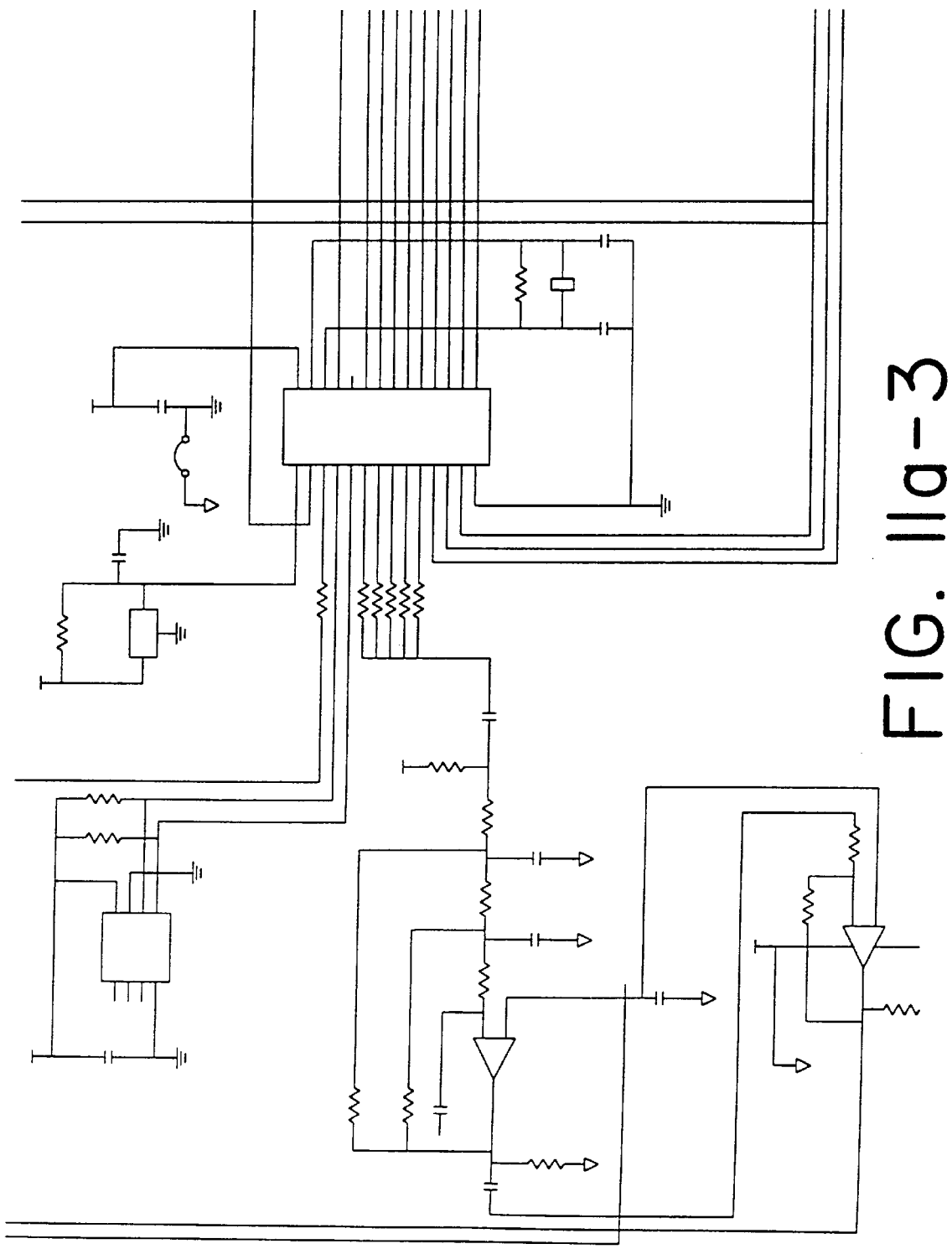
Figures 4, 11A:
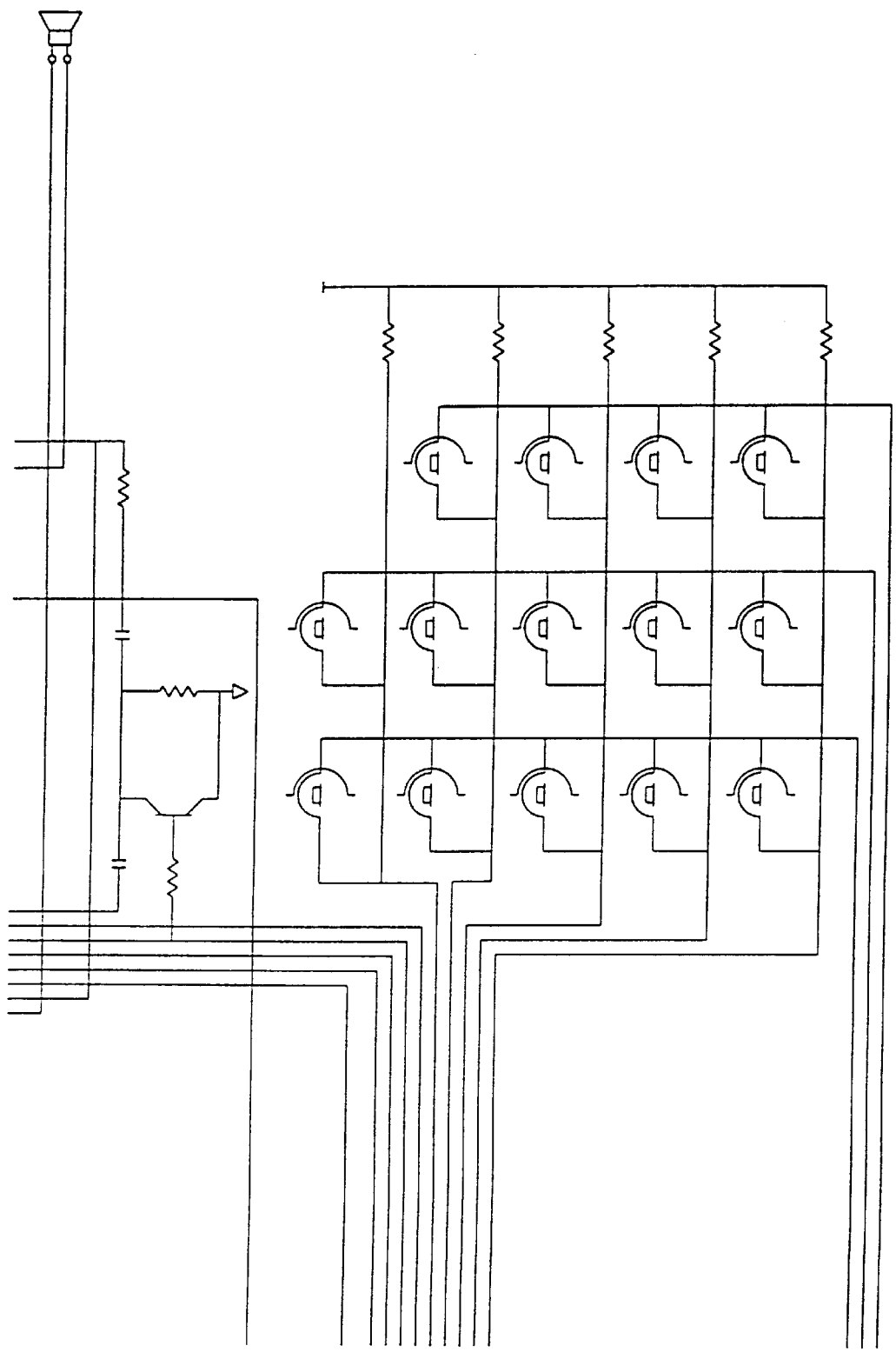

The present invention constitutes a GTS, i.e. a Global Tracking System, for enabling monitoring and tracking vehicles, or any other moving objects such as children or adults hiking in the woods, or product containers, etc. With reference to FIG. 1, the GTS 10 comprises a conventional global positing system (GPS) receiver 12, operating in conjunction with a similarly entirely conventional, cellular telephone 14 having auto answer and auto dial features. The GTS 10 further includes an interface 16 for coupling the GPS receiver 12 to the telephone 14 and further interface hardware, such as a dual tone multiple frequency (DTMF) board 18, for providing interfacing to the vehicle alarm 20 and/or ignition/lighting/door locks systems 22 of the vehicle.

As is well known, the GPS receiver 12 comprises an antenna 26 for communicating with an array of satellites and thereby, through a triangulation technique, to output latitude and longitude coordinates defining the current global position of the GPS receiver 12. As known, the GPS receiver 12 also outputs speed and direction data. The digitally coded data from the GPS receiver 12 is supplied to the interface 16 which includes speech filtering and synthesizer circuitry to convert the digital data to voice information and to wirelessly transmit that voice information via the antenna 36 of the cellular telephone 14 to a telephone of the vehicle owner 28. Alternatively (or additionally), the information may be called to a police telephone 30, to a privately operated central control station 32 and/or to the vehicle owner's home computer 34, etc.

Figure 2:
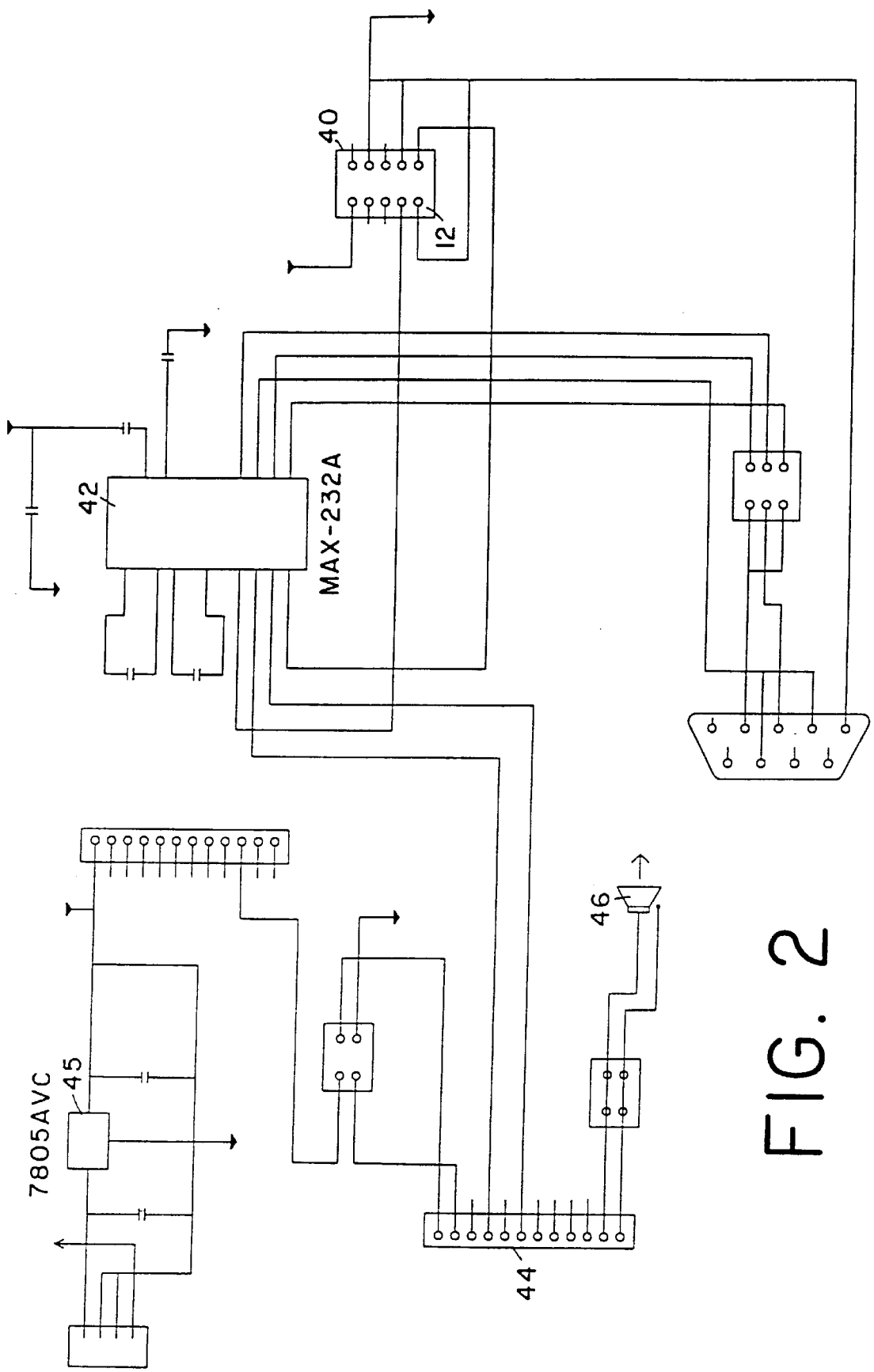
FIG. 2 is a diagrammatic/circuit illustration of a circuit means for converting GPS space coordinates to speech.
Figure 10A:
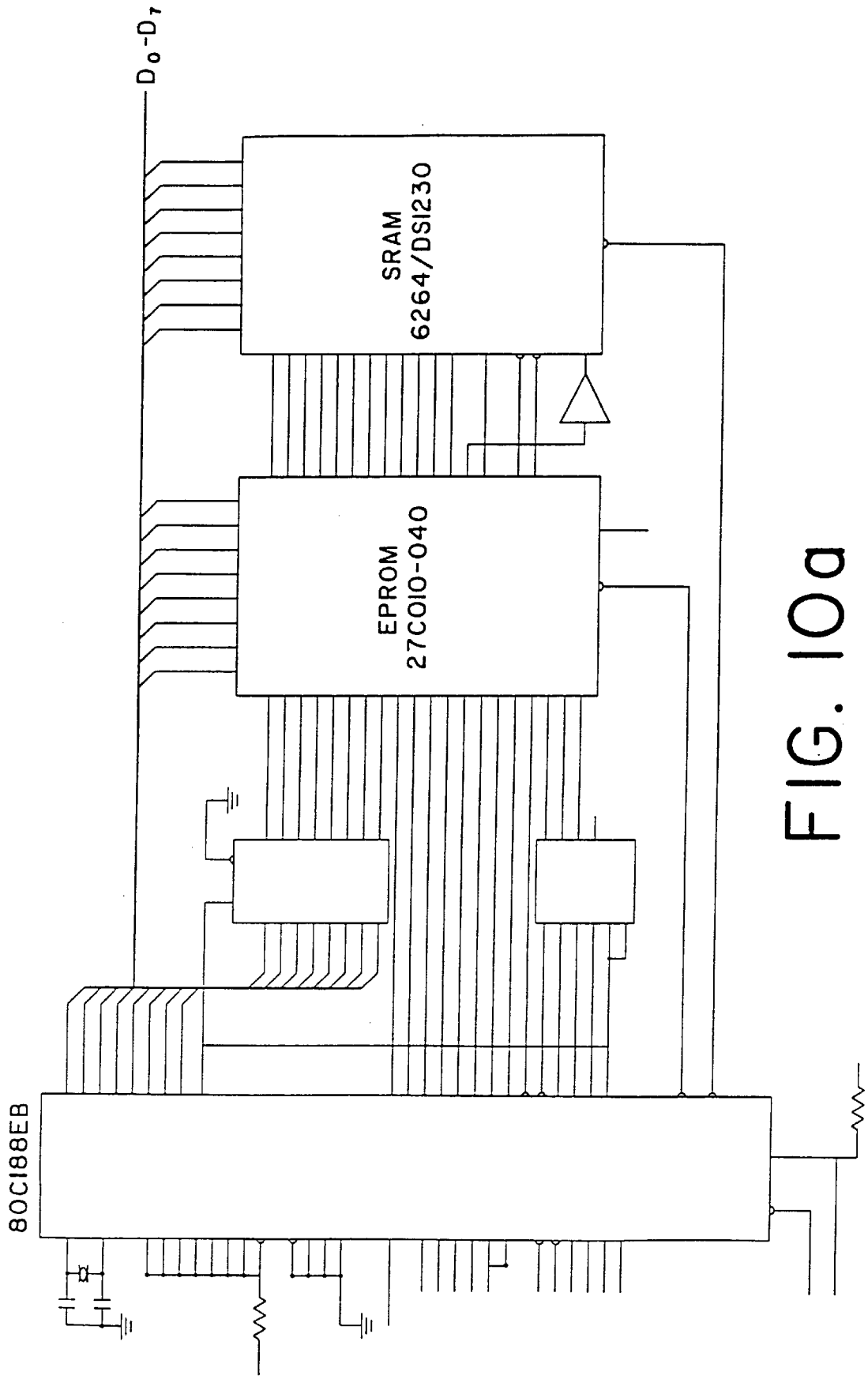
FIGS. 10a, 10b and 10c are schematics of a voice synthesizer circuit.
Figure 10B:
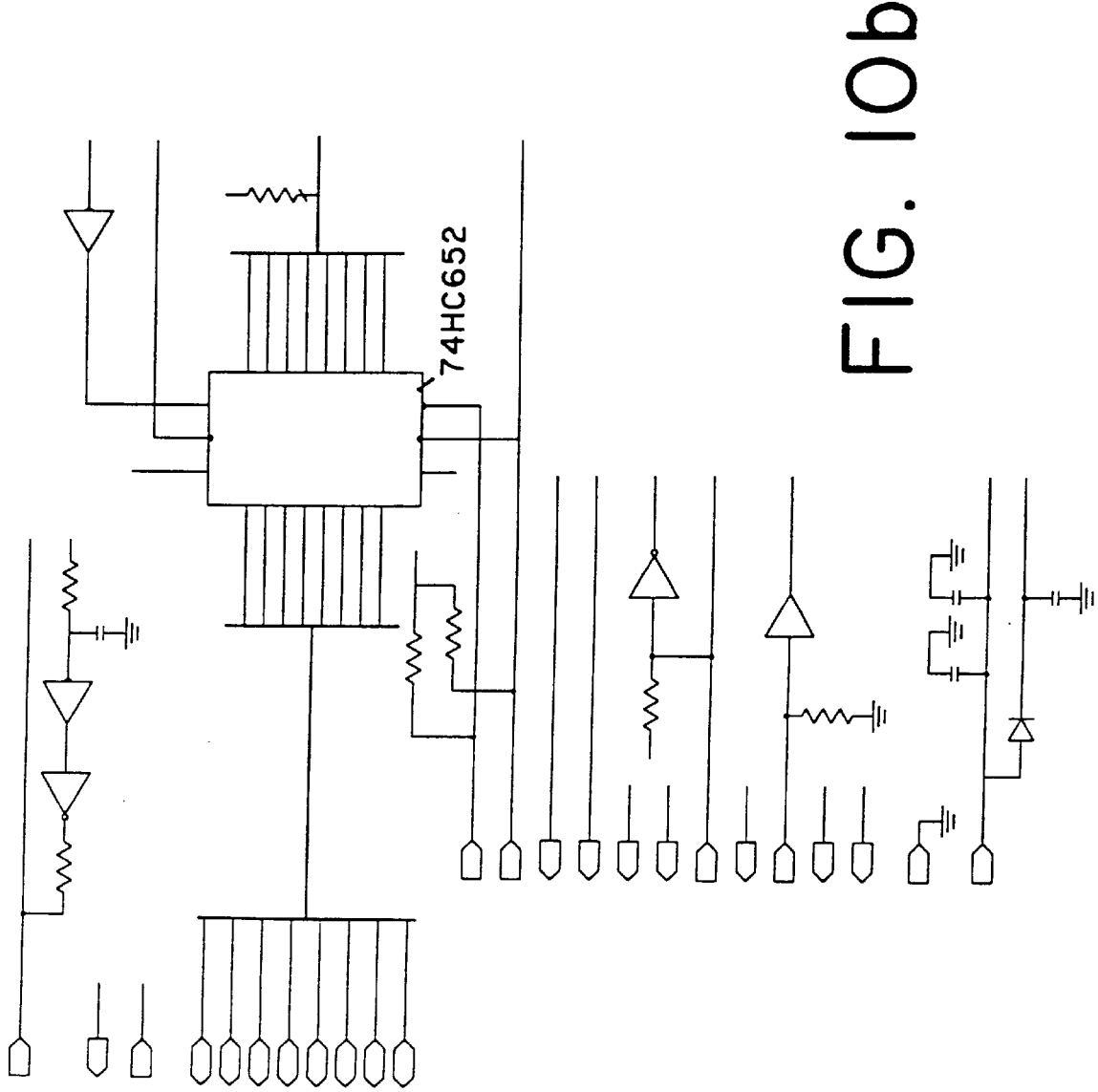
Figure 10C:
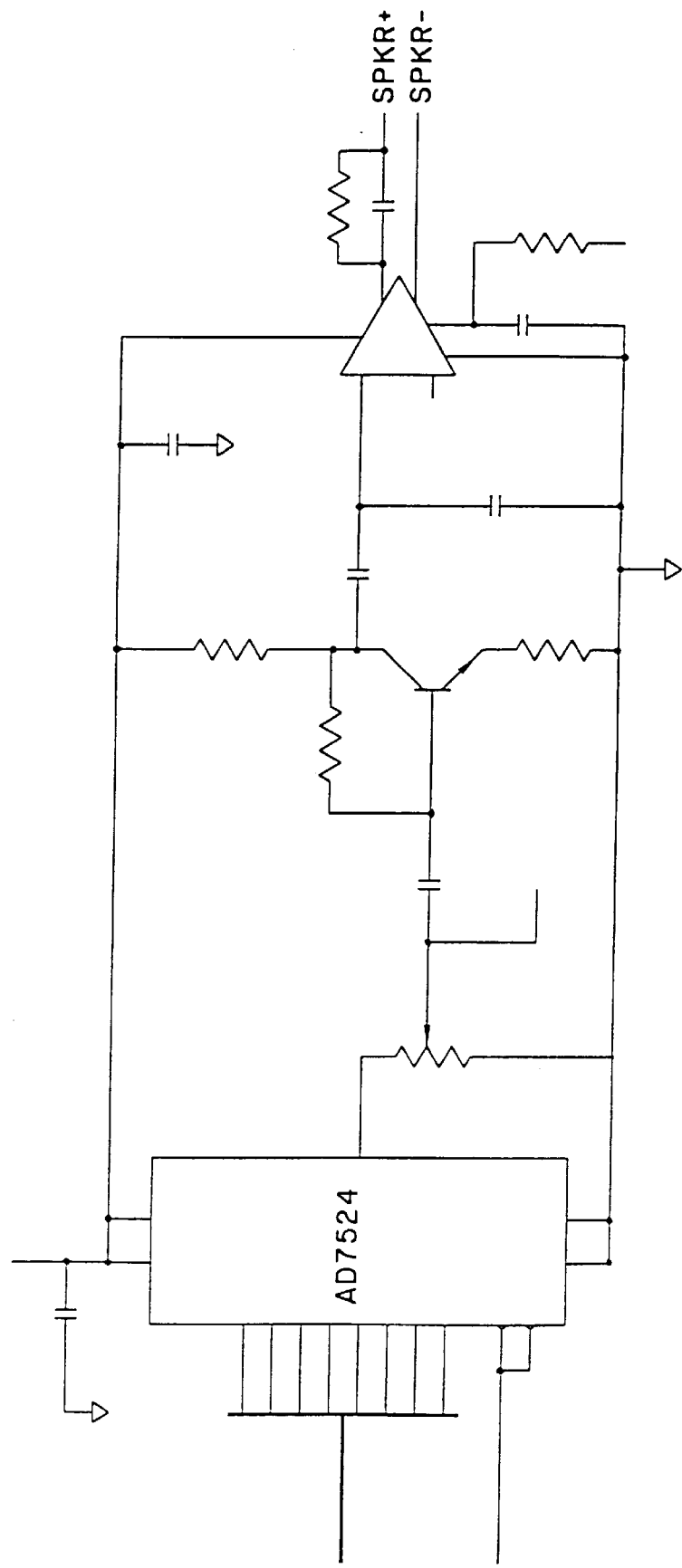

FIG. 2 further details the overall system configuration, and shows that the GPS receiver 12, which can be any known receiver unit made by Motorola, Encore, Rockwell, etc., has a digital serial output provided through a connector 40. The serial output is supplied to the input of a filtering interface circuit 42, for example a MAX-232 standard filtering interface and voltage-level adjusting circuit, to further supply the filtered longitude/latitude coordinate data via a further connector 44 to a speech synthesizer circuit such as, for example, an RC system 8600 speech board 45. The board 44 serves to convert the spacial coordinates into spoken words, which are then played through a speaker 46 to the microphone input of the cellular phone 14. Voice reproduction can also be made by recording on a digital IC chip #SD-9 such words as North, East, South, West, numerals e.g., one, two, etc., and speed, e.g. miles per hour. The GPS output data will then go through a microprocessor controller to retrieve the numbers and words needed. Speech synthesizer circuits, as such, are well known in the art and one embodiment thereof is illustrated herein in the form presented in FIGS. 10a, 10b and 10c. See also the dialor controller schematic presented in FIGS. 11a and 11b.

Figure 3:
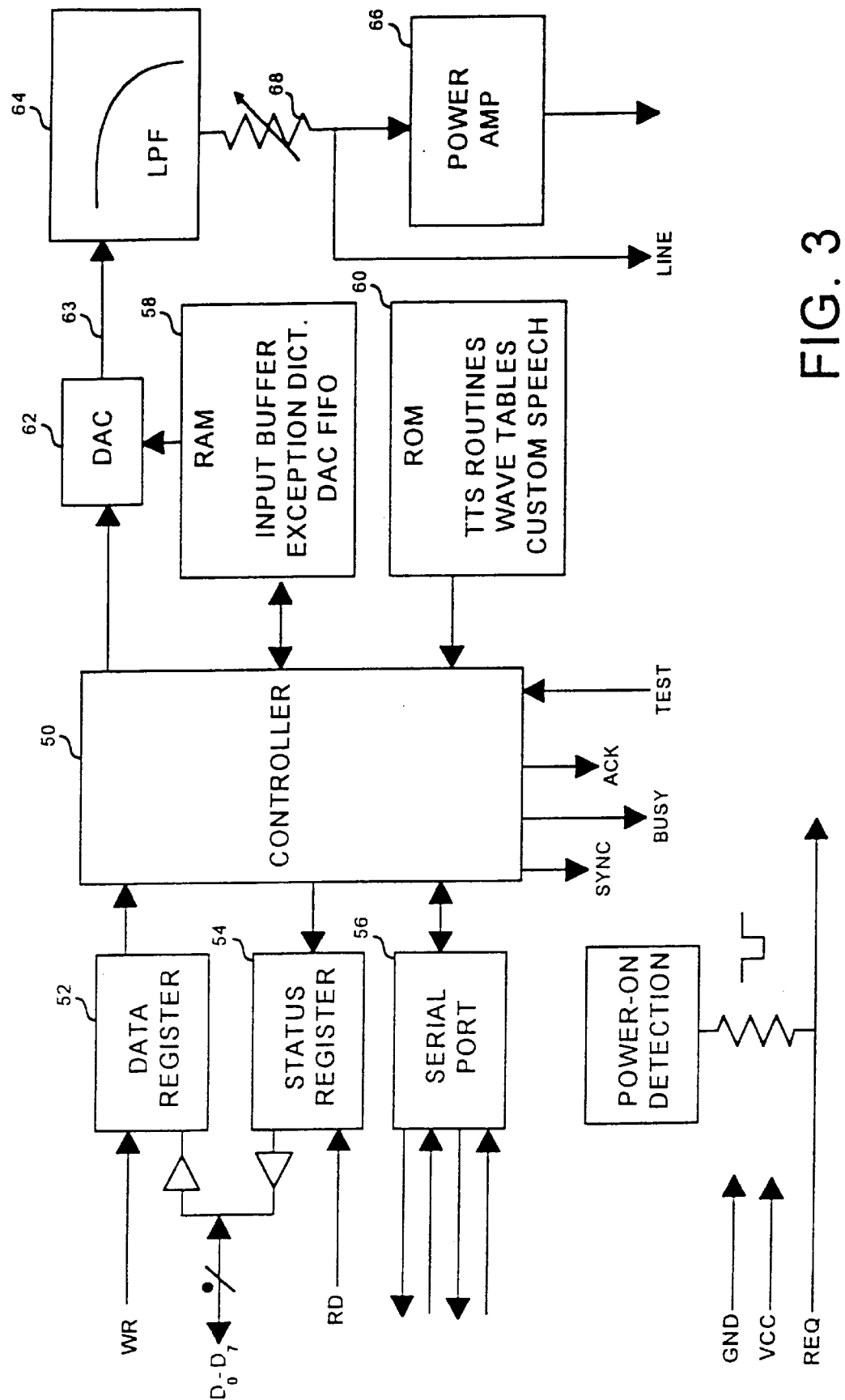
FIG. 3 is a block diagram of a speech synthesizer for use with the interface of the present invention.

FIG. 3 is the generalized block diagram of a speech synthesizer. Overall control is provided by a controller 50, for example, a microprocessor, which interfaces with data and status registers 52 and 54, through which parallel digital data is supplied and/or received. Communication with the controller 50 is also provided via the serial port 56. In any case, digital information, for example from the GPS receiver 12, can then be used to access wave tables and other speech generating means stored in a ROM 60 to be supplied to a random access memory (RAM) 58 and used to provide inputs to the digital to analog converter (DAC) 62, which in well known manner, converts the digital data to an analog speech signal 63. The speech signal 63 is then passed through a low pass filter 64 and then to a power amplifier 66 to drive a speaker, for example, the speaker 46 in FIG. 2. The sound volume is adjustable via a potentiometer 68.

Figure 4:
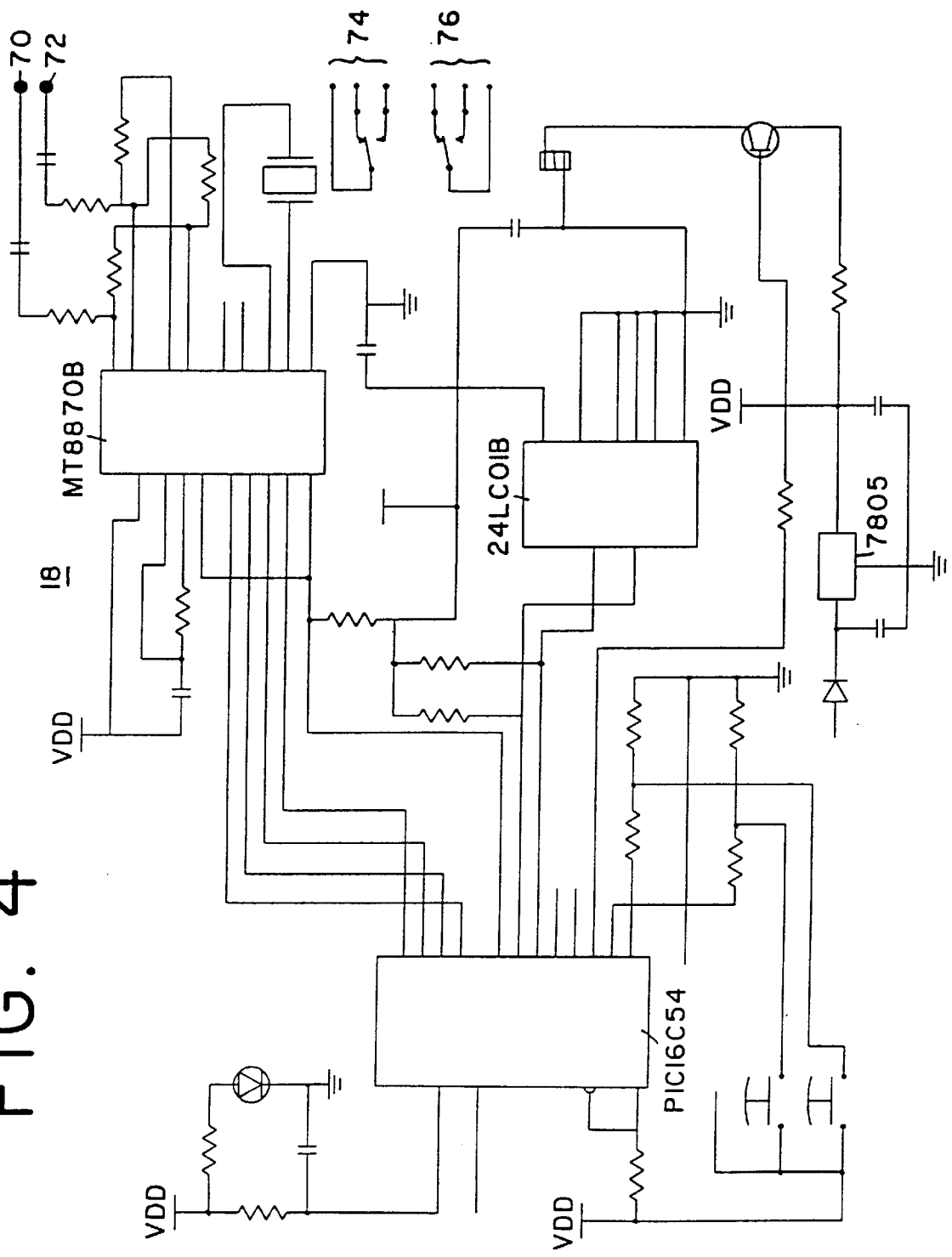
FIG. 4 is a schematic of a dual tone multiple frequency (DTMF) circuit for converting telephone keyboard commands to electrical outputs capable of controlling vehicle functions.

A representative dual tone multiple frequency (DTMF) circuit 18 is illustrated in FIG. 4. These types of circuits are, per se, known in the art. Generally, they have input terminals 70, 72 for receiving telephone signals which are generated in response to the pressing of keys on the telephone handset. These signals are frequency encoded and can be decoded by the illustrated circuitry to provide various outputs, for example in the form of open/closed relay contacts, such as the contacts 74 and 76. In any event, the DTMF circuit 18 permits inputs from such devices as the vehicle alarm etc. to be coupled to the interface/controller 16 in FIG. 1 and/or appropriate outputs to be generated. For example, the vehicle lights can be selectively turned on and off to signal law enforcement agencies that the vehicle is being driven by an unauthorized person, or to cause the vehicle battery to be discharged to immobilize the vehicle. Or these outputs can be used to disable the ignition or operate the doors and/or trunk and hood panels. The use of the DTMF circuit 18 is quite versatile as should be appreciated from the foregoing examples.

Figure 5:
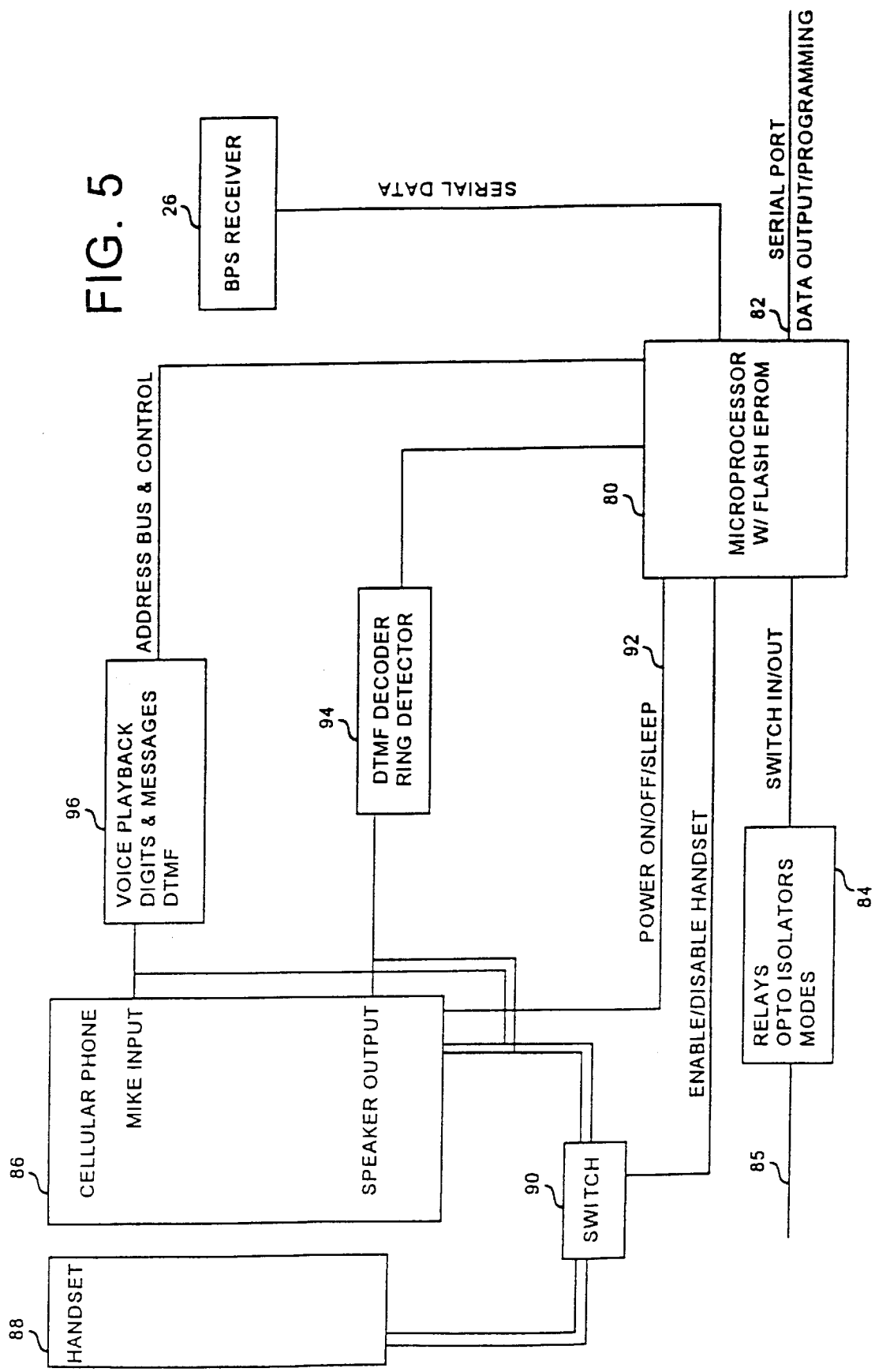
FIG. 5 is a block diagram of system hardware of a more elaborate, second embodiment of the present invention.

The block diagram of the GTS unit 10 of FIG. 5 is generally similar to FIG. 1 except that it illustrates that the interface can be a more sophisticated controller in the form of a microprocessor 80 including flash EPROM, RAM and other interface/control circuits. This microprocessor 80 has a serial port 82 for receiving serial data from a keyboard or other control device, for being programmed or reprogrammed to perform various functions. The microprocessor 80 also controls a battery of relays, optocouplers, or similar devices which are collectively represented by the block 84. These outputs 85 serve to interface the device 80 with the various automobile systems 20 and 22 shown in FIG. 1.

The conventional cellular telephone 14 illustrated here has a base 86, handset 88 and a switch 90 that is controlled by the microprocessor 80 to provide several optional modes of communicating voice and otherwise controlling the telephone 14. For example, the output 92 of the microprocessor 80 serves to control the power on/off or sleep modes of the telephone 14. The decoder and ring detector 94 serves a function similar to the circuit 18 in FIG. 1, as described previously. The interface between the telephone 14 and the microprocessor 80 also includes a voice play-back circuit 96 which performs functions similar to the interface 16 in FIG. 1.

A general software flowchart for operating the basic hardware illustrated in FIG. 5 is set forth in FIG. 6. The software has a start block 100 which encompasses all the software instructions/steps needed for initializing various software registers, memories, etc. The program proceeds to block 102 which monitors keypad keys and/or incoming calls and then allows the program to proceed to block 104 which checks whether the person desiring access to the GTS unit 10 possesses a valid PIN code. If yes, the decisional block 106 allows the software to proceed to the block 108 which inputs the code and thereafter determines (at step 110) whether the code is a programming code, or whether the software should perform PIN number setting options at block 112 or check whether the request is to set an alarm PIN code at block 114.

If an alarm function has been requested, alarm related functions are performed in the blocks 116 and 118 based on the inputted program code. Depending on the type of program code that has been entered, the program then proceeds to the block 120 to reset a default status and also to set an option status, disarm the alarm and enable the handset, as needed. Alternatively, the program proceeds to the block 122 to power up the phone or to disable the handset; or to dial an emergency number, announce a position, etc., all in accordance with the command that has been entered.

If an alarm PIN code is detected in block 124, the program announces the vehicle position in block 126, or it checks to determine whether a police PIN code has been entered in block 128. If so, it proceeds to transmit the position data in block 130.

To prevent repeated, unauthorized attempts to access the GTS unit 10, the program checks in block 132 whether the number of failed attempts to access the system has exceeded a predetermined count. If yes, the program proceeds via block 122 to the start position. Otherwise, the program returns to its initial point to continue monitoring of incoming calls and/or keyboard entries.

A somewhat more generalized, overall software block diagram is presented in FIG. 7. Here, the initializing section is represented by block 150, from which the program proceeds to the "wait for call" block 152. If it detects an off-hook condition 154, it verifies that a properly coded command has been received at 156 and if so, proceeds to perform a PIN (personal identification number) verification at block 158. If a command is not entered within a predetermined time (block 160), the call is terminated and the program returns to the block 152 to await another call (or command). In the event that a valid command has been entered and the PIN number has been verified, the program proceeds to perform the requested function, by selecting and entering an appropriate one of software functional blocks 160–174. The actual number of functional blocks is greater than shown, commensurate with the number of options included with the installed GTS unit 10.

While awaiting a call at 184, the program proceeds in a loop to block 180 to test for any alarm conditions, e.g., whether an alarm condition has been triggered. If an alarm has been set off, the program proceeds to block 182 to determine whether to call the owner pursuant to instructions in block 184, or whether to execute a particular command stored in that block (160-174) that is responsible for dealing with the alarm condition. Alternatively (or in addition), after the owner has been called (block 184) to report an alarm condition, a report is generated in block 186 and the program returns to the wait mode at 154. After a given one of the commands 160–174 have been carried out, the program returns via block 188 to the "wait for call" block 152.

Figure 8:
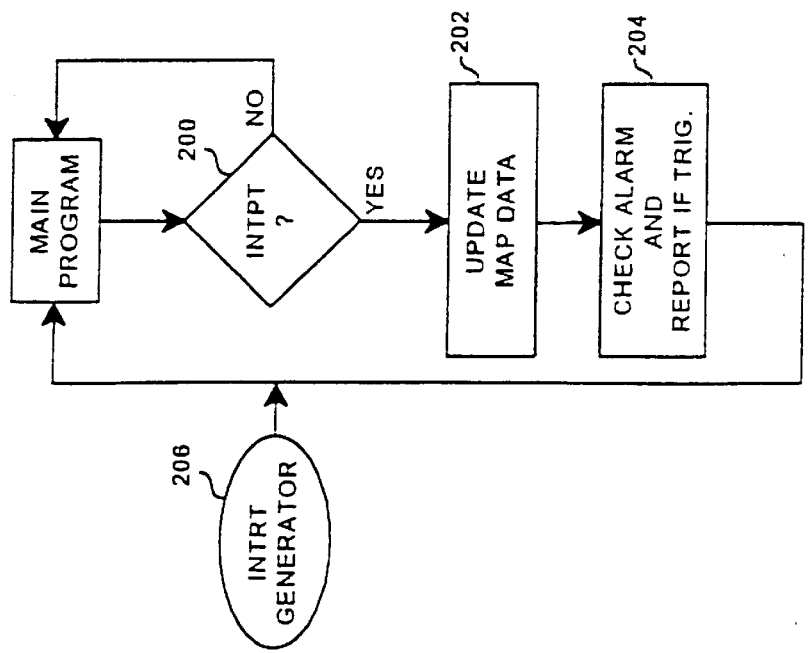
FIG. 8 is a further software block diagram, describing a section of the system software.

While the main program is being executed, the system receives periodic interrupts from an interrupt generator 206, as indicated in FIG. 8. Upon an interrupt, the program proceeds from block 200 to perform periodic housekeeping functions, for example, updating a map display in the vehicle pursuant to instructions located in block 202 (if the vehicle is equipped with that option). Other functions that can be performed periodically include checking the alarm and reporting triggering of the alarm at block 204.

Figure 9:
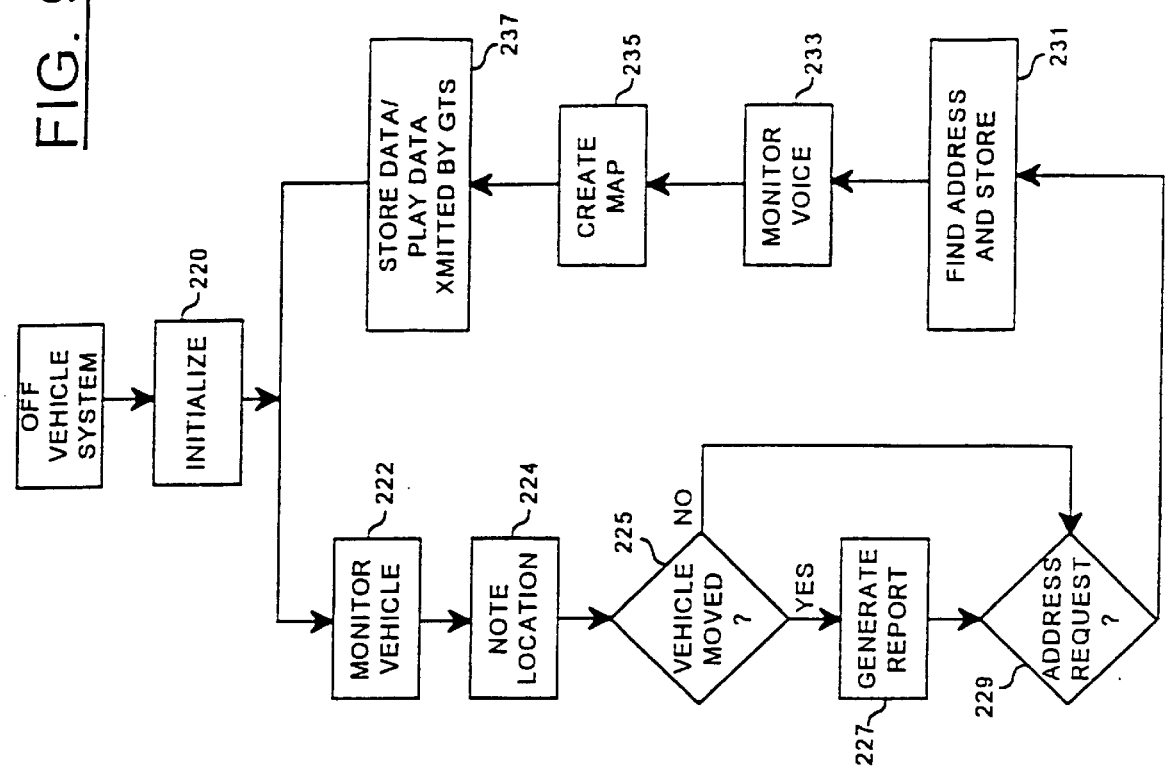
FIG. 9 is another software block diagram, describing other sections of the system software.

The GTS system of the present invention may include, in addition to the on-board GTS unit 10, off-vehicle components as described below by reference to FIG. 9. Thus, the system may include a home computer with a modem for communicating with the GTS unit via a telephone connection. The home computer has special software including an initializing block 220, and program code designed to periodically call the vehicle, as indicated at 222 and note the vehicle location (block 224). If the software has been so programmed, at block 225 the software determines whether the vehicle has been moved. If it has been so moved while it was parked, this fact is noted and a report is generated at block 227. This report may include sounding an alarm at the site of the computer, or calling the owner at a predesignated telephone number to report that the vehicle has just been stolen and to provide the current location thereof. Thus, by the software being programmed to call the vehicle every half hour or so, practically immediate reporting of a stolen vehicle is made possible. An owner alert is also generated when the system is unable to call the vehicle, presumably because the GTS unit has been damaged by a thief.

The home computer software may include many other options. Thus, at block 229 the software determines whether a address command has been entered. If it has, the address is found in a look up table based on the latitude/longitude coordinates that were obtained from the vehicle. The information can be stored or displayed on the panel. If requested, the owner can monitor (block 233) the sound inside the vehicle while it is being legitimately used by others, for example young adults, employees, etc. Block 235 responds to requests to create a map display at the home computer of a route being driven by the vehicle. Block 237 responds to commands requesting that data be relayed from the vehicle to the home computer be stored or played to the owner. This information can include telephone messages stored in the GTS unit 10 on-board the vehicle.

As already mentioned, blocks 160–174 of FIG. 7 represent the various functions performed by the GTS unit 10 of the present invention. Thus, the software block 160 represents the software block which responds to the owner's telephonic request for a voice message announcing the coordinates of the vehicle. For example, the audible message might be "30° latitude north, 25° longitude east", etc. A different command, represented by block 162 controls turning on the vehicle lights, or perhaps flashing them to alert tracking personnel. In the same vein, the block 164 issues the command that allows the owner to remotely disable the vehicle ignition, when and if the vehicle has either stopped or it is otherwise safe to do so based on inputs from the GPS receiver 12 which also provides speed and direction information. Communications with the cellular telephone 14 may be executed (block 166) in a silent mode, so that the person driving car is not even aware that the vehicle telephone has responded to a call.

If the GTS owner has mapping software such as Delorme, Map Expert, or any type of software that will give the location on a map when latitude and longitude information are inputted, the system, as indicated in block 168, plots the path of the vehicle on a map. If the vehicle owner does not have this software option, then the vehicle owner can call a central station, provide the latitude and longitude information and the central station will supply the current location of the vehicle. This can be accomplished by, for example, calling a 900 telephone toll number, thus providing a profitable central station.

Block 170 is dedicated to a portion of the program which monitors whether the alarm of the vehicle has been triggered. It can also be programmed to monitor movements of the car. Thus, if the car has been parked and the vehicle alarm has somehow been defeated, a change in position of, for example, 500 feet will cause an internal, silent alarm to be generated. In response,, the software will cause the telephone to silently call the vehicle owner at any of several telephone numbers. Thus, the invention provides 24 hour satellite monitoring (if desired) of the vehicle by detecting movement in any direction for more than a given distance, e.g., 500 feet, 1,000 feet, etc. The vehicle movement monitoring is accomplished with the GPS receiver, which has an output indicative of such position change, or with the software in the interface. Since many owners do not maintain vital information, the system itself can be programmed to automatically broadcast to the police the vehicle's license number, vehicle identification number, the cellular number, access code and the like in the block 170. The software block 171 is dedicated toward providing mapping functions within the vehicle. Thus, the driver may actuate a sequence of keys to cause the GTS software to call a home computer, provide with coordinates, from time to time, and create a map of a route travelled, or a route to be travelled either on a florescent or LCD display, or print such map on a miniature printer (not shown) in the vehicle.

The range and number of options is quite versatile, including by way of example:
1. A navigation feature, enabling a person who owns the GTS unit and a laptop PC to contact their laptop PC directly through the GTS unit.
2. Mapping software may then be located in the laptop PC (block 171) and the location of the vehicle plotted on the PC monitor as the vehicle is moving. This option includes the possibility of setting a destination address, to obtain mapped directions to the destination.
3. By connecting PCMCIA mapping software to the GTS unit, instead of latitude and longitude data, the GTS unit can call the owner and provide the exact location and street names by using a look-up table in the PCMCIA card.
4. In accordance with yet another option, the GTS also provides UTM coordinates, if the vehicle owner does not want to call a 900 toll number or the owner does not have a PC. This provides a mapping option that allows the owner to rely on an inexpensive paper map that has pre-plotted UTM coordinates thereon.
5. The GTS system can be selectively armed for this option either by entering commands from a keyboard (not shown), or from a remote telephone or even from the local cellular telephone. Alternatively, the GTS system can be wired to sense the alarming of the conventional alarming system, including through the activation of a key-chain type transmitter which is operable in a well-known manner remotely by pressing a transmitter from outside the vehicle.
6. If the vehicle owner is lost, he or she can call a central station and download data from the GTS to a central station. The central station can then provide information regarding the current location of the vehicle and directions to the destination. Naturally, the system inherently provides the ability to dispatch emergency crews such as ambulances, tow trucks, police, etc.

In terms of hardware, the present invention can use a GPS receiver 12 and take advantage of the ASK II or NEMA 0183 data output thereof and couple this data to an ASK II voice converter board. This converter board will convert the ASK II or text to speech (latitude and longitude, speed and direction) by using conventional or special speech synthesizer boards.

By taking the speaker output of the 8600 voice board and connecting it to the microphone input of any cellular telephone that has auto-answer capability, or even auto-dial or theft alarm input, exceedingly simple connection of the cellular phone to the GTS unit is possible. This can be accomplished by either feeding the signals through a hands-free microphone and speaker, through the RJ45 jack on the handset or on the transceiver section. Another option is to simply place the GTS unit next to the phone without any hard-wiring.

By using an off-the-shelf cellular phone, either a portable or a mobile three watt unit that has auto-answer and/or theft alarm inputs, it is possible to connect the phone through its trigger to the vehicle's ignition or existing alarm system, for example the siren. When the battery power is initially applied, either by triggering the existing vehicle or starting the vehicle, if the disarm code is not immediately entered into the handset of the cellular phone within 30 seconds or so, the cellular phone will automatically begin dialing a pre-programmed emergency phone number or a beeper number, etc. The owner of the vehicle is simultaneously provided with the vehicle location, in terms of the latitude and longitude coordinates thereof, in voice format.

The foregoing description assumed the availability of an auto-answer cellular telephone. However, the more elaborate embodiment of the invention depicted in FIG. 5 includes a microprocessor system which includes elaborate interfacing hardware for coupling the GTS unit 10 to the ignition, alarm, lighting, etc. systems of the vehicle.

Other features of the present invention include the ability to custom program the GTS unit by the owner to select desired options. FIG. 7 features not noted previously include the ability to program several telephone numbers which will be automatically dialed if the first or second numbers are busy. Also, a panic button (not shown) may be included with the system so that if the driver is attacked in a parking lot or on a highway, the alarm will sound and the GTS will sequentially call a list of telephone numbers to transmit an automatic distress message, optionally in the owner's own voice. Moreover, the GTS provides immediately the location of the vehicle so that emergency help, e.g. police, can be dispatched promptly.

Still further features include: (1) shutting down the engine or starting the engine to warm-up the vehicle, etc.; (2) turning on the speaker phone in the vehicle to listen to passenger conversations from a location outside the car. It also enables the caller to speak to passengers in the car, or to burglars or car jackers inside the vehicle; (3) turning on the horn or siren at the option of owner from a remote telephone; and (4) turning on or off lights, emergency flashers, brake lights, dome lights, etc. or opening or closing doors.

The GTS unit constitutes an inherent telephone answering machine. Therefore, when the owner is not in the car, the unit will answer cellular phone calls with an outgoing (programmable) message of the owner. When the driver returns, all messages can be retrieved. Optionally, the message can be forwarded to another telephone number. Since the GTS unit is compatible with all PCs and fax machines, when connected to the GTS, it will automatically send and receive computer or fax data without the owner being in the vehicle.

Other benefits of the invention include potential discounts in auto insurance costs. The unit is a portable system that can be removed from the vehicle to be used in a home, office, hotel, etc. The system can be used in any type of vehicle, including boats, airplanes, trucks, cargo containers, railroad cars, etc. If a truck or cargo container of valuable merchandise is broken into, the GTS unit will call the owner/central station with an alarm condition and the location. The unit can be embedded in containers of merchandise with little likelihood of being located. It can be used by armored car companies, fleet and trucking companies to protect the route of their vehicles, or if there is a robbery, to dispatch the appropriate help.

Theme parks such as Disney Land, Disney World, Great Adventure, etc. could use the GTS units to locate lost or kidnapped children, by strapping units to their bodies by belts, etc. The GTS unit could also be made into the size of a beeper to be worn by children, hikers, campers, anyone and, if the person is missing for a long time, the concerned person could call and get their location and/or condition. The system can be used as a second back-up alarm system in stores, businesses, home, etc. The list of options includes an ability to call the owner's beeper and leave digital or voice messages; and connectability with any type of CCTV (for example, a micro video-camera the size of a 9 Volt battery) video unit, to take real-time video pictures inside the vehicle. These video pictures could be transmitted anywhere, including to the owner so as to provide even more enhanced surveillance/monitoring of the vehicle.

The GTS unit can also be connected with a small camera (the size of a cigarette filter) to take 24 still photos of the interior of the vehicle, even in total darkness using infrared technology. This will identify a car thief or a car jacker. The system can be used in stores. The system can store these pictures on an IC chip inside the GTS unit for later downloading to any PC for reproduction as photos, etc. TVX, Inc. makes a camera that transmits its signal (video pictures) over cellular lines. It is called Visual Alarm Verification System.

Figure 12:
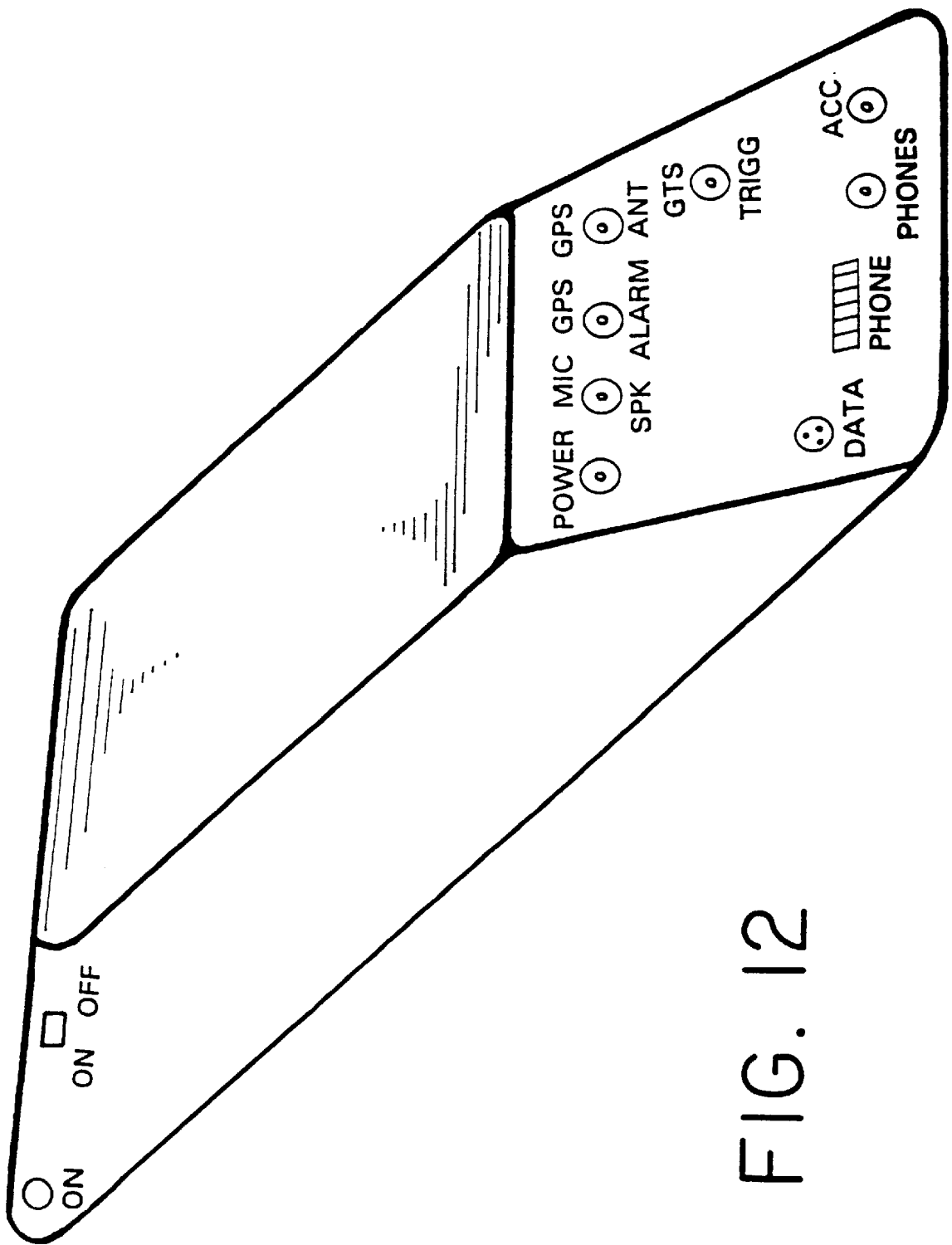
FIG. 12 is a perspective of the GTS unit housing.
Figure 13:
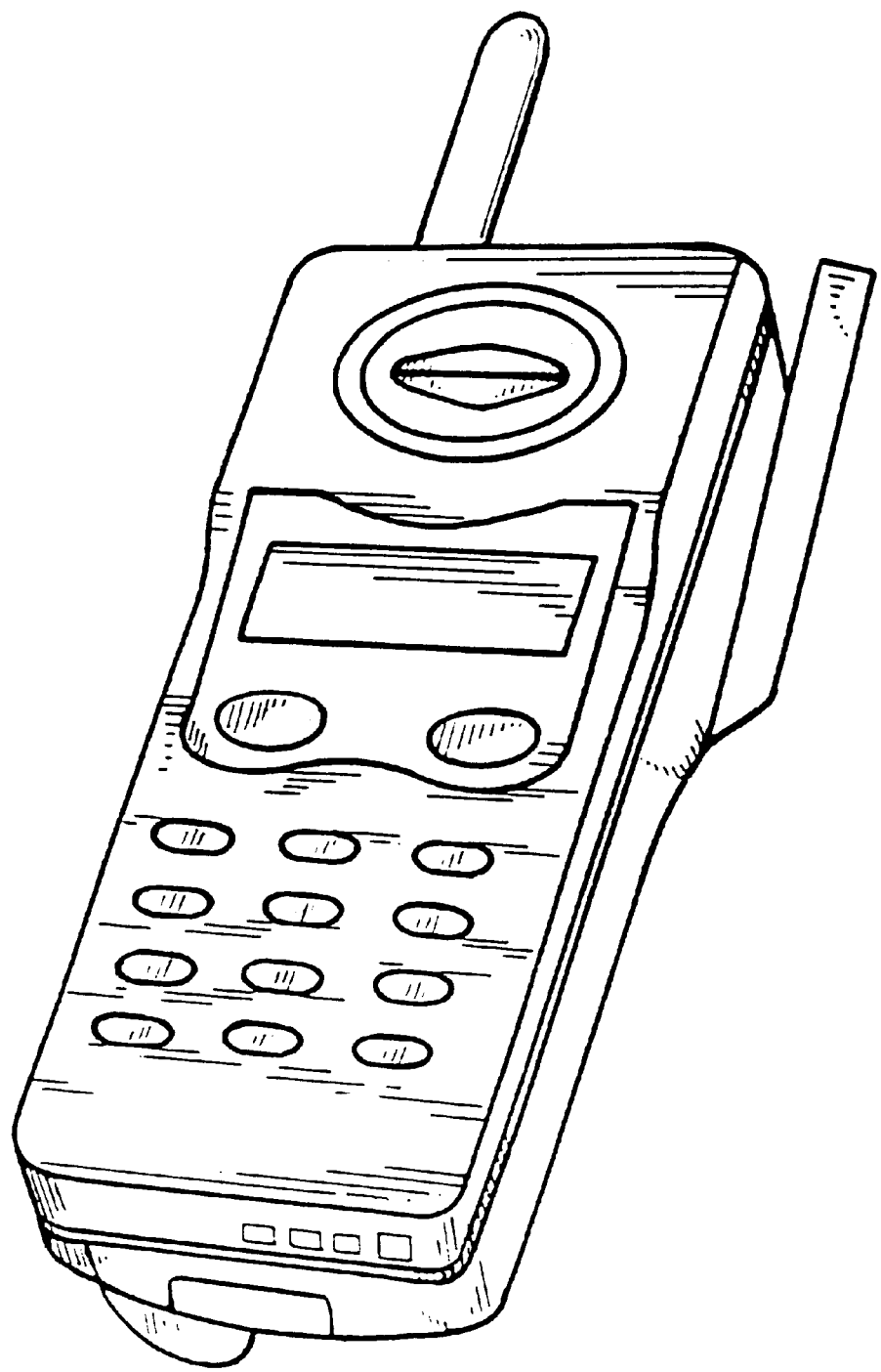
FIG. 13 shows one mode by which the GTS unit can be connected to a conventional flip phone.
Figure 14:
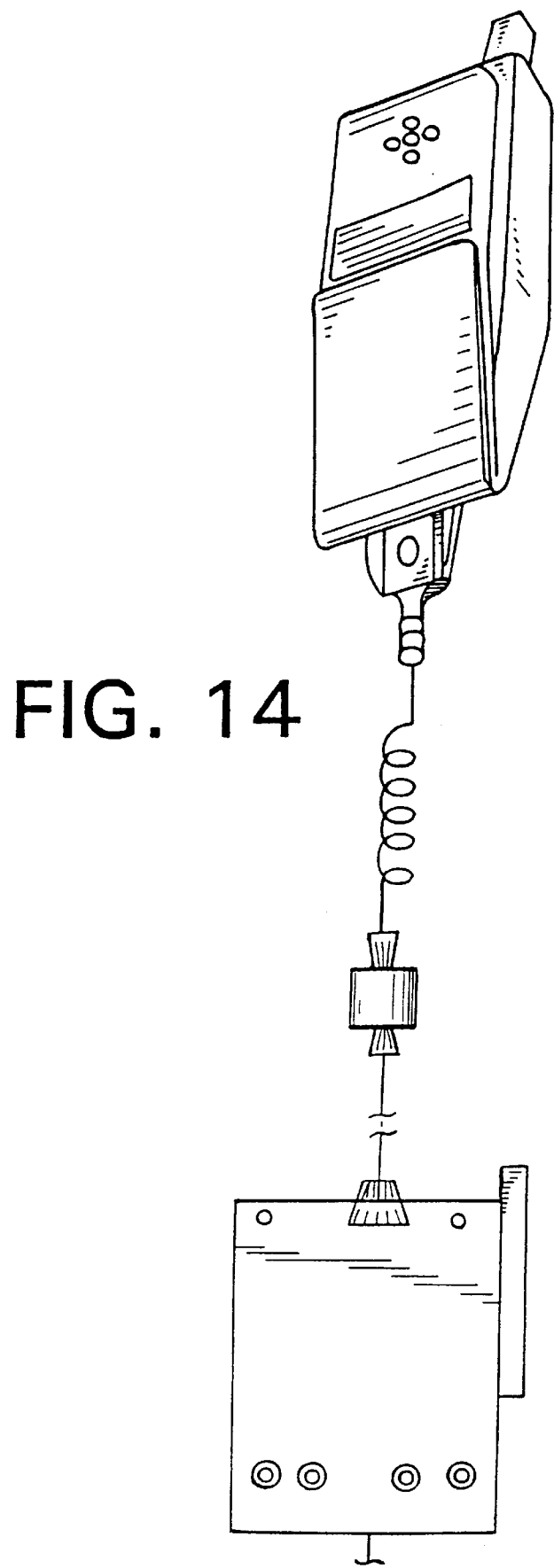
FIG. 14 shows another connection between a conventional flip phone and the GTS unit of the present invention.
Figure 15:
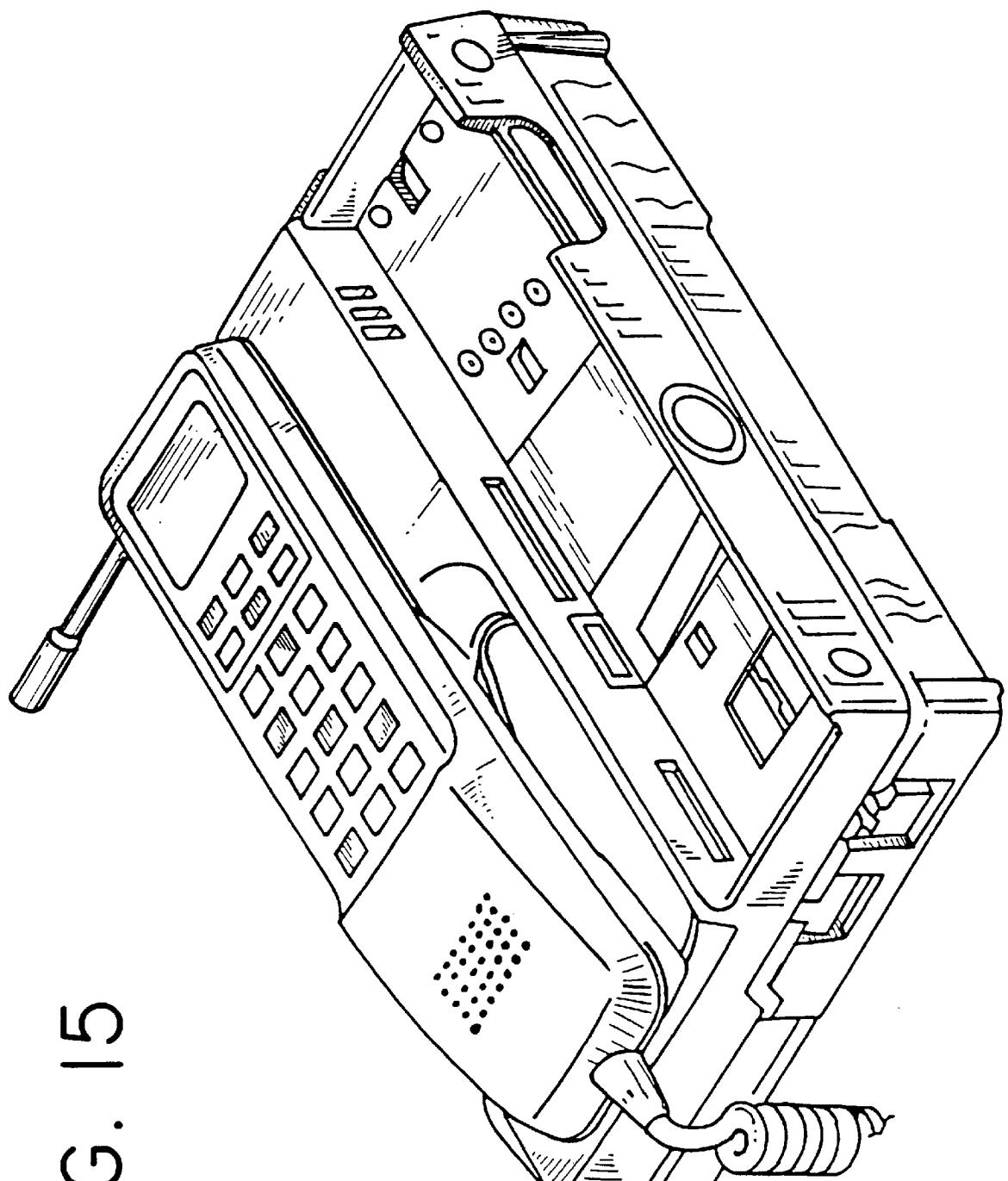
FIG. 15 shows a conventional transportable cellular telephone including a compartment for the GTS unit of the present invention.
Figure 16A:
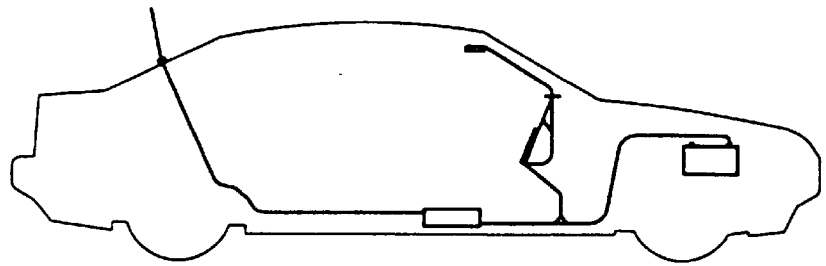
FIG. 16 is a first installation schematic for the GTS unit of the present invention.
Figure 16B:
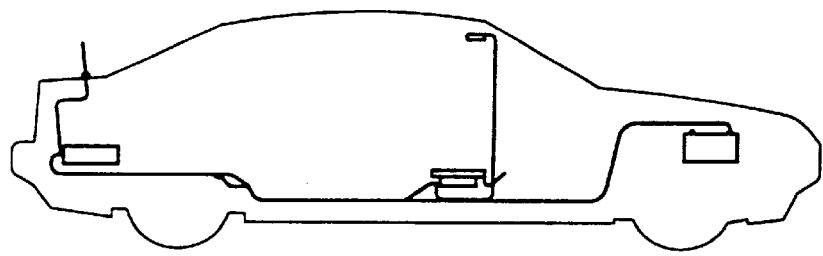
Figure 17:
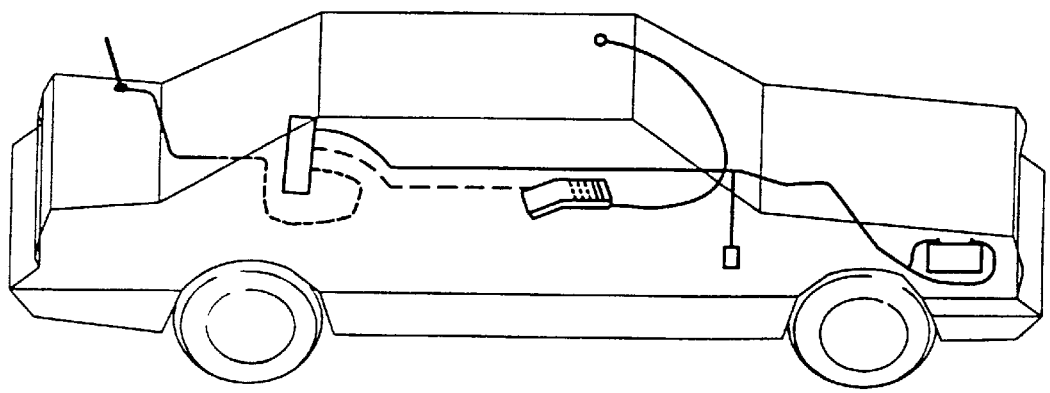
FIG. 17 is a second installation schematic for the GTS unit of the present invention.

Further aspects of the invention include the ability to locate, i.e., house, the GPS receiver unit 12 inside of a MOTOROLA Flip-Phone battery compartment (FIG. 15). Another approach is for the person owning a Flip-Phone to slide the GPS receiver 12 (FIG. 12) onto the existing Flip-Phone (FIG. 13). As noted previously, by connecting the GTS unit 10 to the microphone and speaker of any cellular phone (FIG. 14), and by activating the emergency dialer or a pre-programmed phone number stored in the memory of the cellular phone, the invention enables the cellular phone to automatically dial an emergency phone number to alert the owner of a break-in or movement of his/her vehicle. This can be effectuated, for example, by activating the number 1 key for 1½ seconds on a MOTOROLA Flip-Phone. Responsive to the alarm, the owner then inputs his access code number to download the spatial coordinates from the GPS receiver 12 to help find the vehicle. By using the built-in movement alarm contained in the GPS receiver 12, the system of the present invention is portable and self-contained and, as such, need not necessarily be physically attached or be hard-wired to another object or device such as the interface 16 or DTMF circuit 18.

A further feature of the invention includes providing the GTS unit to monitor the movements of a person and outfitting that person with a horizontal position indicator, for example, a mercury switch. The switch, which can be located inside the GTS unit will be arranged so that if the person falls down as a result of having, for example, fainted or having been knocked down or being otherwise in distress, the emergency call to the guardian of that person will be triggered automatically. A panic button on the unit can help to monitor lost Alzheimer patients. Since the GTS unit is in effect a two-way communication device, instructions can be broadcast to the Alzheimer patient to assure his/her safety.

In the above description, communications with the GTS unit is via telephone transmissions of voice or data. Instead, the data can be converted to DTMF tones and these tones can be sent via the cellular phone or any other means of communication to a remote location where it is to be decoded by an inexpensive DTMF decoder (eliminating the need for a modem). Such data can be transmitted by UHF, VHF or any transmitter available. Finally, the GTS unit can be made into a watch size using an existing cellular phone like MICRO-TALK WATCH and piggybacking a GPS receiver and voice module onto it.

The GTS could also be used by the medical industry by simply connecting a medical device, for example, pulse monitor, heart monitor, pacemaker monitor, sugar level monitor, etc., and programming the GTS or medical device for high or low threshold of these medical devices. When it reaches the program threshold it (on the advice of the doctor) will trigger the GTS to call an emergency phone number and tell the called party the medical emergency. It will give the location of the patient, and whether the person is standing, or lying down (unconscious) by using a simple mercury switch inside the GTS.

To make the unit wireless all you have to do is put the medical device on the person. It will trigger the GTS, for example, by interfacing the medical device output to the Low power transmitter and sending the trigger signal to the receiver attached to the GTS trigger input.

Both transmitter and receiver could be an off the shelf unit, the size of a dime. By making it wireless and using the transmitter and receiver for GTS and medical device, there will be no wires connecting the medical device on the person to the GTS. It allows a person to use his cellular phone normally and the cellular phone and GTS to be kept a distance away from the person with the medical device and still be able to trigger the GTS from a distance depending on the power, i.e., range, of the transmitter.

The GTS can be preprogrammed to trigger if it moves beyond a specified distance. To be worn on children, Alzheimer patient, or person under house or specific area arrest. If the person moves out of the specific area, the GTS will call an emergency number preprogrammed by the user and tell the called party the person's location and where he/she is headed. The called party can also speak with the person, and direct the person accordingly.

The above is accomplished by programming the GPS and the micro controller to signal when the GPS detects changing of coordinates of more than a specified programmable threshold and by triggering and activating a preprogrammed emergency phone numbers in the cellular phone memory. Instead of using a cellular transmitter as described above, a transmitting device interfacing with the GTS may interface with a house phone. The transmitter should have enough wattage to provide sufficient signal strength to broadcast over the preprogrammed distance threshold selected for triggering the GTS. The non-cellular house phone would do the dialing of the emergency phone numbers.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A global tracking system (GTS) for monitoring an alarm condition associated with and locating a movable object, the GTS comprising:

a cellular telephone located with the movable object;

a GPS (global positioning system) receiver located with the movable object, the GPS receiver being effective for providing data reflecting a present spacial position of the movable object, in terms of spacial latitude/longitude coordinates;

an interface between the GPS receiver and the cellular telephone, the interface being connected between the GPS receiver and the cellular telephone and including circuitry for transmitting the spacial coordinates from the GPS receiver through the telephone, wirelessly to a remote location; and an alarm for detecting that the object has been moved, by calculating a spatial movement of the object which exceeds a predetermined distance based on information supplied by the GPS receiver, and the alarm initiating the transmission to the remote location the spatial coordinates from the GPS receiver when said movement of predetermined distance has been detected.

2. The tracking system of claim 1, the interface including a sound generating circuit for converting electronically coded data reflecting the spacial coordinates to audible information for being transmitted to the remote location.

3. The tracking system of claim 2, the sound generating circuit comprising a speech synthesizer.

4. The tracking system of claim 2, including means for triggering the GTS unit to output the spacial coordinates of the movable object to the interface in response to a command entered via a remote telephone located at the remote location.

5. The tracking system of claim 1, in which the movable object is a vehicle.

6. The tracking system of claim 1, in which the interface comprises a micro-computer for interfacing between the GTS unit and the cellular telephone.

7. The tracking system of claim 5, in which the interface includes an external hardware interface.

8. The tracking system of claim 7, in which the external hardware interface includes means for interfacing with an alarm system of the vehicle.

9. The tracking system of claim 7, in which the external hardware interface includes means for interfacing with an ignition system of the vehicle.

10. The tracking system of claim 7, in which the external hardware interface comprises a DTMF circuit for interfacing between the interface and external components of the vehicle.

11. The tracking system of claim 5, including means for generating a map of a route travelled by the vehicle.

12. The tracking system of claim 5, including means for enabling an owner of the vehicle to control the lights and ignition thereof.

13. The tracking system of claim 5, including means for converting the spatial latitude/longitude coordinates to address information.

14. The tracking system of claim 13, wherein the means for obtaining address information constitutes address look-up tables.

15. The tracking system of claim 1, including means for converting the spatial coordinates to DTMF tones.

16. A global tracking method for monitoring an alarm condition and locating a movable object, the method comprising:

outfitting the movable object with a cellular telephone;

outfitting the object with a GPS (global positioning system) receiver for providing data reflecting a present spatial position of the movable object, in terms of spatial latitude/longitude coordinates thereof;

interfacing the GPS receiver and the cellular telephone via an interface and using the interface to convert the spatial latitude/longitude coordinates to speech and transmitting the speech through the cellular telephone to a remote location; and detecting an alarm condition by calculating movements of the movable object which exceed a predetermined distance based on the data provided from the GPS receiver and transmitting an alarm to the remote location responsive thereto, when said movements of predetermined distance have been detected.

17. A global tracking system (GTS) for monitoring an alarm condition and locating a movable object, the GTS comprising:

a GPS (global positioning system) receiver located with the movable object, the GPS receiver being effective for providing data reflecting a present spatial position of the movable object, in terms of spatial latitude/longitude coordinates;

means for noting an alarm condition by detecting movement of the movable object which exceeds a predetermined distance; and means for transmitting the occurrence of such movement wirelessly to a remote location in response to said alarm condition and when said movements of predetermined distance have been detected.

18. The tracking system of claim 17, further including means for converting the spatial latitude/longitude coordinates to DTMF tones.

19. The tracking system of claim 17, further including transmitting the spatial latitude/longitude coordinates to the remote location via UHF/VHF transmitters.

20. The tracking system of claim 17, in which the means for transmitting constitutes a cellular telephone and in which the GPS receiver is directly connected to a microphone and speaker which are associated with the cellular telephone.

21. The tracking system of claim 17, in which the movable object is a person and including a medical sensor coupled to the person and the transmitting means transmitting an alarm to the remote location whenever a threshold value associated with the medical sensor has been detected.

22. The tracking system of claim 17, in which the moveable object is a person and including a horizontal position indicator for being worn by the person for detecting when the person has fallen down, the transmitting means including means for transmitting the occurrence of such fall to the remote location.

23. The tracking system of claim 17, in which the predetermined distance is programmably adjustable by a user.

24. The tracking system of claim 17, in which the movable object is a vehicle having an interior and including a camera for photographing the interior of the vehicle.

25. The tracking system of claim 17, in which the means for transmitting comprises a cellular telephone including autoanswering capability and including means for allowing the cellular telephone to answer a telephone call originating at the remote location automatically and to provide to the remote information comprising a voice message reflecting the data associated with the present spatial position of the vehicle.

* * * * *